United States Patent
Kedalagudde et al.

(10) Patent No.: US 9,596,628 B2
(45) Date of Patent: Mar. 14, 2017

(54) GATEWAY ARRANGEMENTS FOR WIRELESS COMMUNICATION NETWORKS

(71) Applicants: Intel Corporation, Santa Clara, CA (US); Intel IP Corporation, Santa Clara, CA (US)

(72) Inventors: Meghashree Kedalagudde, Hillsboro, OR (US); Muthaiah Venkatachalam, Beaverton, OR (US); Wu-Chi Feng, Tigard, OR (US); Puneet Jain, Hillsboro, OR (US)

(73) Assignees: INTEL CORPORATION, Santa Clara, CA (US); INTEL IP CORPORATION, Santa Clara, CA (US)

( * ) Notice: Subject to any disclaimer, the term of this patent is extended or adjusted under 35 U.S.C. 154(b) by 178 days.

(21) Appl. No.: 14/513,041

(22) Filed: Oct. 13, 2014

(65) Prior Publication Data
US 2015/0117408 A1   Apr. 30, 2015

Related U.S. Application Data

(60) Provisional application No. 61/898,425, filed on Oct. 31, 2013, provisional application No. 61/909,938, filed on Nov. 27, 2013.

(51) Int. Cl.
*H04W 88/08* (2009.01)
*H04W 36/00* (2009.01)
(Continued)

(52) U.S. Cl.
CPC ..... *H04W 36/0027* (2013.01); *H04W 76/021* (2013.01); *H04W 76/022* (2013.01); *H04W 76/025* (2013.01); *H04W 88/16* (2013.01)

(58) Field of Classification Search
CPC .................................. H04W 88/16–88/188
(Continued)

(56) References Cited

U.S. PATENT DOCUMENTS

2010/0208704 A1   8/2010   Wu
2010/0272115 A1   10/2010   Ramankutty
(Continued)

FOREIGN PATENT DOCUMENTS

EP   2259657 A1   12/2010

OTHER PUBLICATIONS

International Search Report and Written Opinion mailed Jan. 19, 2015 from International Application No. PCT/US2014/060511.
(Continued)

*Primary Examiner* — Andrew Chriss
*Assistant Examiner* — Kenan Cehic
(74) *Attorney, Agent, or Firm* — Schwabe, Williamson & Wyatt, P.C.

(57) ABSTRACT

Embodiments related to gateway arrangements for wireless communication networks are disclosed herein. For example, in some embodiments, a network controller computing system may include serving gateway (SGW) control plane circuitry to virtualize control plane functions of an SGW, packet data network gateway (PGW) control plane circuitry to virtualize control plane functions of a PGW, first communication circuitry to establish a first secure communication link between the SGW control plane circuitry and an SGW user plane computing system that is to perform user plane functions of an SGW, and second communication circuitry to establish a second secure communication link between the PGW control plane circuitry and a PGW user plane computing system that is to perform user plane functions of a PGW. Other embodiments may be disclosed and/or claimed.

9 Claims, 9 Drawing Sheets

(51) Int. Cl.
*H04W 76/02* (2009.01)
*H04W 88/16* (2009.01)

(58) Field of Classification Search
USPC .................................................. 370/410–450
See application file for complete search history.

(56) References Cited

U.S. PATENT DOCUMENTS

| | | |
|---|---|---|
| 2010/0309886 A1 | 12/2010 | Vikberg et al. |
| 2011/0098048 A1* | 4/2011 | Zhang .................. H04W 64/00 455/438 |
| 2011/0292885 A1 | 12/2011 | Cuervo et al. |
| 2012/0303835 A1* | 11/2012 | Kempf .................. H04W 24/02 709/235 |
| 2015/0282236 A1* | 10/2015 | Chai ..................... H04W 76/02 370/329 |
| 2016/0127933 A1* | 5/2016 | Javed ..................... H04L 43/12 370/241 |

OTHER PUBLICATIONS

3GPP, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.7.0 (Sep. 2013), LTE Advanced, 286 pages.

\* cited by examiner

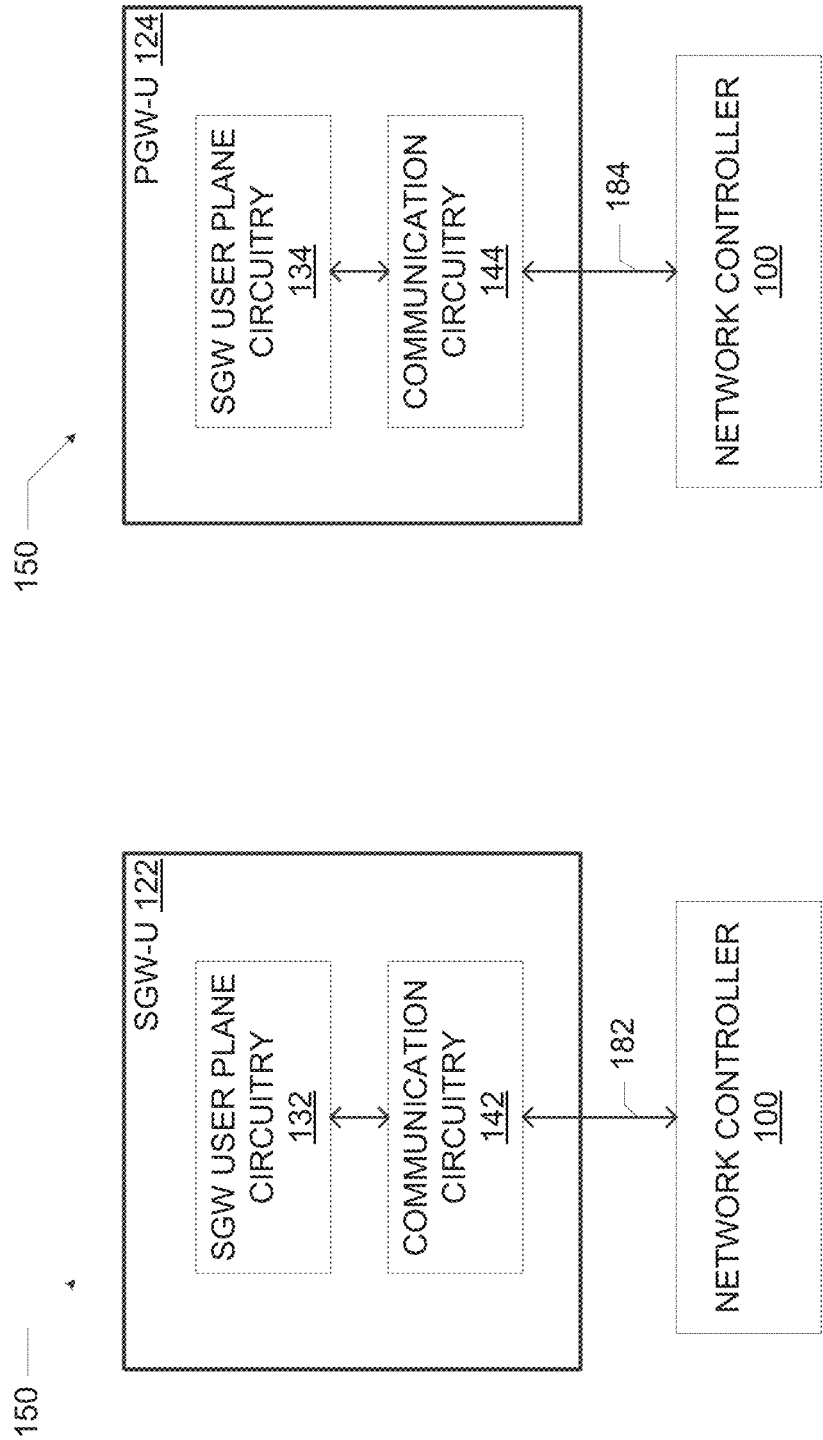

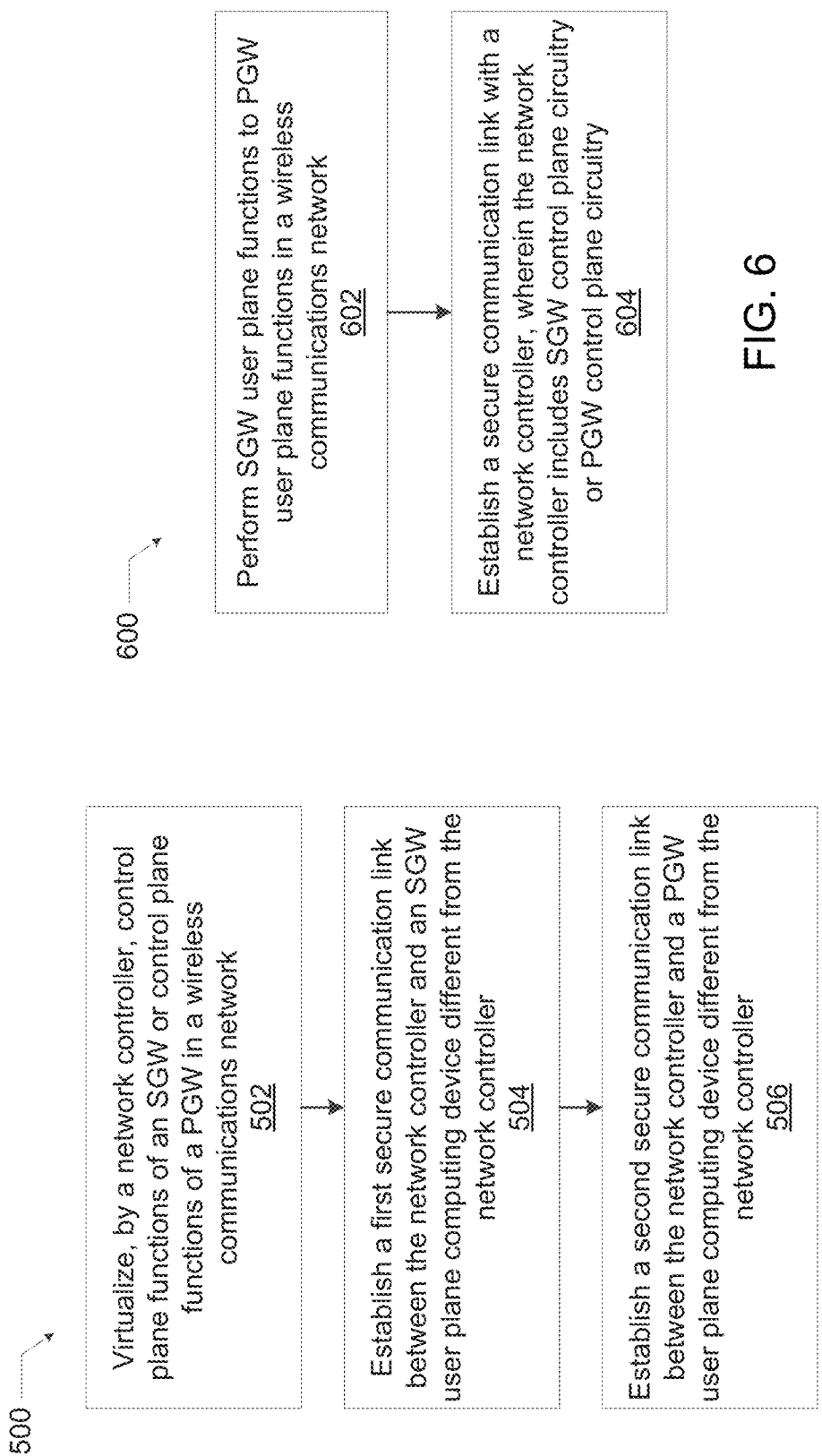

GATEWAY ARRANGEMENTS FOR WIRELESS COMMUNICATION NETWORKS

CROSS-REFERENCE TO RELATED APPLICATIONS

This application claims priority to U.S. Provisional Application No. 61/898,425, filed Oct. 31, 2013 and entitled "ADVANCED WIRELESS COMMUNICATION SYSTEMS AND TECHNIQUES," and to U.S. Provisional Application No. 61/909,938, filed Nov. 27, 2013 and entitled "ADVANCED WIRELESS COMMUNICATION SYSTEMS AND TECHNIQUES," which are hereby incorporated by reference herein in their entireties.

FIELD

Embodiments of the present disclosure generally relates to the field of wireless communication, and more particularly, to gateway arrangements for wireless communication networks.

BACKGROUND

Demands on wireless communication networks continue to increase. Network operators and service providers have been limited, however, in their ability to quickly and efficiently respond to changes in demand without sacrificing the performance of time-sensitive services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 illustrates a portion of a wireless communication network including a serving gateway user plane computing system (SGW-U), in accordance with various embodiments.

FIG. 3 illustrates a portion of a wireless communication network including a packet data network gateway user plane computing system (PGW-U), in accordance with various embodiments.

FIG. 5 is a flow diagram of a process for operating a network controller computing system, in accordance with various embodiments.

FIG. 6 is a flow diagram of a process for operating a gateway user plane computing system, in accordance with various embodiments.

DETAILED DESCRIPTION

Figure 1:
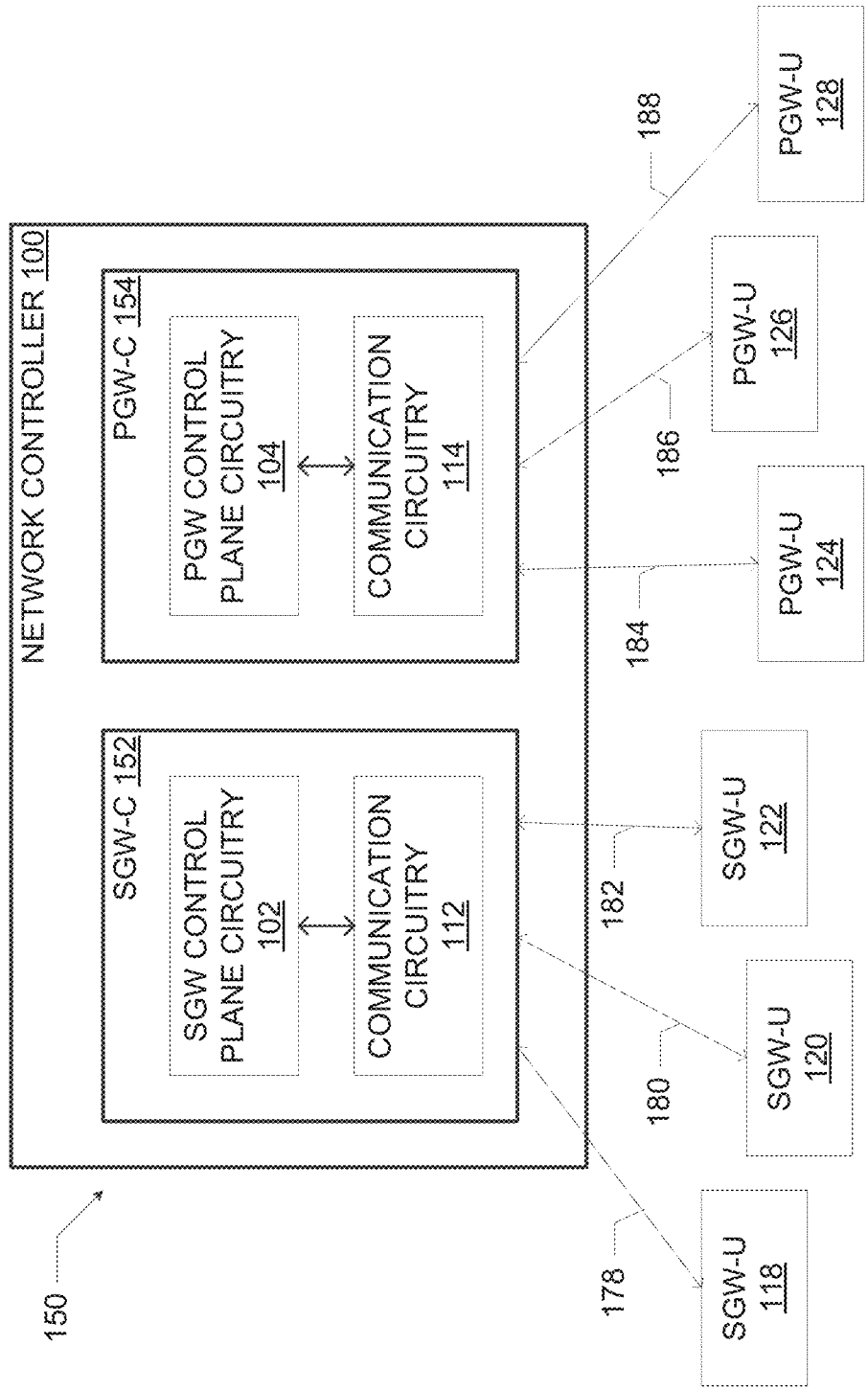
FIG. 1 illustrates a portion of a wireless communication network including a network controller computing system with a serving gateway control plane computing system (SGW-C) and a packet data network gateway control plane computing system (PGW-C), in accordance with various embodiments.

Embodiments of the present disclosure include gateway arrangements for wireless communication networks. In particular, various embodiments of the present disclosure include systems and methods for separating user plane and control plane functionality of a serving gateway (SGW) and systems and methods for separating user plane in control plane functionality of a packet data network gateway (PGW) in a wireless communication network. As known in the art, functions of an SGW may include acting as a local mobility anchor point for handover of user equipments (UEs) between access nodes (ANs), packet routing and forwarding, transport level packet marking in the uplink and the downlink, among others. Functions of a PGW may include per-user based packet filtering, allocating of Internet Protocol (IP) addresses to UEs, transport level packet marking in the uplink and downlink, uplink and downlink service level gating control, and packet screening, among others.

The user plane of a component of a wireless communication network includes functions for transporting user data through the network. The control plane of a component of a wireless network includes protocols for control and support of the user plane functions. Examples of control plane functions may include controlling network access connections (e.g., such as attaching a UE to and detaching the UE from a radio access network), controlling attributes of an established network access connection (e.g., activating an Internet Protocol (IP) address), controlling the routing path of an established network connection, and controlling the assignment of network resources to meet demand.

Various ones of the embodiments disclosed herein may enable an efficient and scalable implementation for providing wireless communication functionality in a cloud computing architecture. In particular, various ones of the embodiments disclosed herein may enable a network control cloud architecture for evolved packet core (EPC) functionality in a Third Generation Partnership Project (3GPP) network.

Various ones of the embodiments disclosed herein may implement the control plane of various network functions as a software defined network (SDN) cloud service. In particular, various ones of the embodiments disclosed herein may separate the control plane and user plane of various network functions, and may utilize cloud-based processing to provide the control plane of the network functions (e.g., within and EPC controller), while the user plane functions are provided by special-purpose hardware or other computing systems coupled to the control plane by a secure communication link.

In particular, some of the embodiments disclosed herein may enable the virtualization of various network functions previously implemented by special-purpose hardware. Conventionally, when demand increases on a wireless network, additional units of such special-purpose hardware must be purchased, shipped, installed, and configured in order to respond to the increased demand. Virtualization of some of the functions performed by conventional special-purpose hardware may enable new instantiations of the functionality to be created quickly and at much lower cost, thereby improving the ability of providers to respond to changes in demand.

However, replacing special-purpose hardware with a virtualized counterpart may come at the cost of higher processing overhead and therefore slower performance. Thus, in various embodiments disclosed herein time-sensitive functionality may continue to be implemented with special-purpose hardware, while less time sensitive functionality may be virtualized. For example, user plane functionality (such as the transport of voice data packets) may be particularly time sensitive in the sense that only a small amount of delay in packet delivery is tolerated, while control plane functionality may be less time sensitive (e.g., five seconds of delay in establishing a voice call may be acceptable, but five seconds of delay during active voice communication may not be acceptable). Decoupling the computing systems used to provide the user plane functionality and the control plane functionality (e.g., of a gateway and a wireless network) may enable the control plane functionality to be implemented in one computing system (e.g., a virtualized environment) while the user plane functionality is implemented in another computing system (e.g., special-purpose hardware). Various ones of the embodiments disclosed herein may enable this decoupling, which may further enable improved responsiveness to changes in demand without sacrificing the performance of time-sensitive functions.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, a computing system may be said to "virtualize" a particular functionality when the computing system instantiates one or virtual machines (on one or more computing devices) that are configured to perform the particular functionality. The instantiation of a virtual machine may be performed in accordance with known virtualization techniques, and may utilize a virtual machine monitor or other known virtual machine management techniques. In some embodiments, a computing system having one or more processors may virtualize a functionality by executing machine readable instructions that cause the computing system to be configured to perform the functionality. In some embodiments, a computing system may virtualize a functionality by configuring circuitry (e.g., one or more processors and memory devices in the computing system) to perform the functionality.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality.

The embodiments described herein may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes, Node Bs, gateways, bridges, hubs and satellite radiotelephones. Further, the radio systems within the scope of embodiments may include satellite systems, personal communication systems (PCSs), two-way radio systems, global positioning systems (GPS), two-way pagers, personal computers (PCs) and related peripherals, personal digital assistants (PDAs), and personal computing, among others.

Embodiments of the systems and methods described herein may be implemented in broadband wireless access networks including networks operating in conformance with one or more protocols specified by the Third Generation Partnership Project (3GPP) and its derivatives, the Worldwide Interoperability for Microwave Access (WiMAX) Forum, the IEEE 802.16 standards (e.g., IEEE 802.16-2005 Amendment), the Long Term Evolution (LTE) project along with any amendments, updates, and/or revisions (e.g., advanced LTE project, ultra mobile broadband (UMB) project (also referred to as 3GPP2), etc.). Many of the examples described herein may refer to wireless communication networks that conform with 3GPP for ease of discussion; however, the subject matter of the present disclosure is not limited in this regard and the described embodiments may apply to other wireless communication networks that may benefit from the systems and techniques described herein, such as specifications and/or standards developed by other special interest groups and/or standard development organizations (e.g., Wireless Fidelity (Wi-Fi) Alliance, WiMAX Forum, Infrared Data Association (IrDA), etc.).

Referring now to FIG. 1, a portion of an example wireless communication network 150, in accordance with various embodiments, is illustrated. The wireless communication network 150 may be configured as a wireless personal area network (WPAN), a wireless local area network (WLAN), and a wireless metropolitan area network (WMAN), for example. As discussed below, the wireless communication network 150 may be configured for improved arrangements of control plane and user plane gateway functionality.

The wireless communication network 150 may include a network controller computing system 100 (abbreviated herein as "network controller"). In some embodiments, the network controller 100 may be an evolved packet core (EPC) controller. The network controller 100 may include a serving gateway control plane computing system (SGW-C) 152 and a packet data network gateway control plane computing system (PGW-C) 154. In some embodiments, the SGW-C 152 and the PGW-C 154 may be implemented in a common physical computing device. In some embodiments the SGW-C 152 and the PGW-C 154 may be implemented in different physical computing devices.

The SGW-C 152 may include serving gateway (SGW) control plane circuitry 102 and communication circuitry 112. The SGW control plane circuitry 102 may be configured to provide control plane functions of an SGW in the wireless communication network 150. In some embodiments, the SGW control plane circuitry 102 may be configured to virtualize these control plane functions.

The communication circuitry 112 may be communicatively coupled with the SGW control plane circuitry 102 and may be configured to establish a secure communication link between the SGW control plane circuitry 102 and at least one SGW user plane computing system (SGW-U). An SGW-U may be configured to provide user plane functions of an SGW in the wireless communication network 150, and may be a different computing system than the network controller 100. The secure communication link between an SGW-U and the SGW control plane circuitry 102 may be used for the exchange of control messages during wireless communication operations. Any of the secure communication links discussed herein is provided by any suitable protocol, such as Open Flow, ForCES, PCEP NetConf, and IRS.

FIG. 1 illustrates a configuration in which the SGW-C 152 is in communication with three SGW-Us 118, 120, and 122 via secure communication links 178, 180, and 182, respectively. The three SGW-Us 118, 120, and 122 may be different computing systems. Although three SGW-Us are illustrated in FIG. 1, the SGW-C 152 may be in communication with more or fewer SGW-Us. For ease of illustration, the SGW-U 122 may be principally discussed herein, and other SGW-Us (such as the SGW-Us 118 and 120) may be configured as described herein with reference to the SGW-U 122. Various embodiments of the SGW-U 122 are discussed below with reference to FIG. 2.

The communication circuitry 112 may include an antenna and/or a wired communication interface, and may be configured to receive and/or transmit wired and/or wireless signals to other computing systems as described herein. An antenna may include one or more directional or omnidirectional antennas such as dipole antennas, monopole antennas, patch antennas, loop antennas, microstrip antennas, and/or other types of antennas suitable for reception and/or transmission of radio frequency (RF) or other wireless communication signals. A wired communication interface may be configured for communication over an electrically conductive carrier and/or an optical carrier, for example. Examples of wired communication interfaces may include Ethernet interfaces and fiber optic interfaces. In some embodiments, the communication circuitry 112 may be configured to receive data from and/or transmit data to an SGW-U (e.g., the SGW-U 122). In some embodiments, the communication circuitry 112 may be configured to receive data from and/or transmit data to other components of the network controller 100 or other computing systems separate from the network controller 100 (e.g., as described below with reference to FIG. 4).

The PGW-C 154 may include packet data network gateway (PGW) control plane circuitry 104 and communication circuitry 112. The PGW control plane circuitry 104 may be configured to provide control plane functions of a PGW in the wireless communication network 150. In some embodiments, the PGW control plane circuitry 104 may be configured to virtualize these control plane functions.

The communication circuitry 114 may be communicatively coupled with the PGW control plane circuitry 104 and may be configured to establish a secure communication link between the PGW control plane circuitry 104 and at least one PGW user plane computing system (PGW-U). A PGW-U may be configured to provide user plane functions of a PGW in the wireless communication network 150, and may be a different computing system than the network controller 100. The secure communication link between a PGW-U and the PGW control plane circuitry 104 may be used for the exchange of control messages during wireless communication operations.

FIG. 1 illustrates a configuration in which the PGW-C 154 is in communication with three PGW 124, 126, and 128 via secure communication links 184, 186, and 188, respectively. The three PGWs 124, 126, and 128 may be different computing systems. Although three PGW-Us are illustrated in FIG. 1, the PGW-C 154 may be in communication with more or fewer PGW-Us. For ease of illustration, the PGW-U 124 may be principally discussed herein, and other PGW-Us (such as the PGW-Us 126 and 128) may be configured as described herein with reference to the PGW-U 124. Various embodiments of the PGW-U 124 are discussed below with reference to FIG. 3.

The communication circuitry 114 may include an antenna and/or a wired communication interface, and may be configured to receive and/or transmit wired and/or wireless signals to other computing systems as described above with reference to the communication circuitry 112 of the SGW-C 152, and may include any suitable ones of the components described above with reference to the communication circuitry 112. In some embodiments, the communication circuitry 114 may be configured to receive data from and/or transmit data to a PGW-U (e.g., the PGW-U 124). In some embodiments, the communication circuitry 114 may be configured to receive data from and/or transmit data to other components of the network controller 100 or other computing systems separate from the network controller 100 (e.g., as described below with reference to FIG. 4).

FIG. 2 illustrates a portion of the wireless communication network 150 including the SGW-U 122, in accordance with various embodiments. The SGW-U 122 may include SGW user plane circuitry 132 and communication circuitry 142. The SGW user plane circuitry 132 may be configured to provide user plane functions of an SGW in the wireless communication network 150. In some embodiments, the SGW user plane circuitry 132 may be configured to virtualize these user plane functions.

The communication circuitry 142 may be communicatively coupled with the SGW user plane circuitry 132 and may be configured to establish (e.g., by communication with the communication circuitry 112 of the SGW-C 152) the secure communication link 182 between the SGW user plane circuitry 132 and the network controller 100 (e.g., between the SGW user plane circuitry 102 and the SGW-C 152). As noted above, the SGW-U 122 may be a different computing system than the network controller 100. The secure communication link 182 between the SGW-U 122 and the network controller 100 may be used for the exchange of control messages during wireless communication operations.

The communication circuitry 142 may include an antenna and/or a wired communication interface, and may be configured to receive and/or transmit wired and/or wireless signals to other computing systems (e.g., the network controller 100), and may include any suitable ones of the components described above with reference to the communication circuitry 112. In some embodiments, the communication circuitry 142 may be configured to receive data from and/or transmit data to an SGW-C (e.g., the SGW-C 152). In some embodiments, the communication circuitry 142 may be configured to receive data from and/or transmit data to other components of the wireless communication network 150 (e.g., as described below with reference to FIG. 4).

FIG. 3 illustrates a portion of the wireless communication network 150 including the PGW-U 124, in accordance with various embodiments. The PGW-U 124 may include PGW user plane circuitry 134 and communication circuitry 144. The PGW user plane circuitry 134 may be configured to provide user plane functions of a PGW in the wireless communication network 150. In some embodiments, the PGW user plane circuitry 134 may be configured to virtualize these user plane functions.

The communication circuitry 144 may be communicatively coupled with the PGW user plane circuitry 134 and may be configured to establish (e.g., by communication with the communication circuitry 114 of the PGW-C 154) the secure communication link 184 between the PGW user plane circuitry 134 and the network controller 100 (e.g., between the PGW user plane circuitry 104 and the PGW-C 154). As noted above, the PGW-U 124 may be a different computing system than the network controller 100. The secure communication link 184 between the PGW-U 124 and the network controller 100 may be used for the exchange of control messages during wireless communication operations.

The communication circuitry 144 may include an antenna and/or a wired communication interface, and may be configured to receive and/or transmit wired and/or wireless signals to other computing systems (e.g., the network controller 100), and may include any suitable ones of the components described above with reference to the communication circuitry 112. In some embodiments, the communication circuitry 144 may be configured to receive data from and/or transmit data to an PGW-C (e.g., the PGW-C 154). In some embodiments, the communication circuitry 144 may be configured to receive data from and/or transmit data to other components of the wireless communication network 150 (e.g., as described below with reference to FIG. 4).

In some embodiments, the SGW-U 122 and the PGW-U 124 may be implemented in a common physical computing device. In some embodiments the SGW-U 122 and the PGW-U 124 may be implemented in different physical computing devices.

Figure 4:
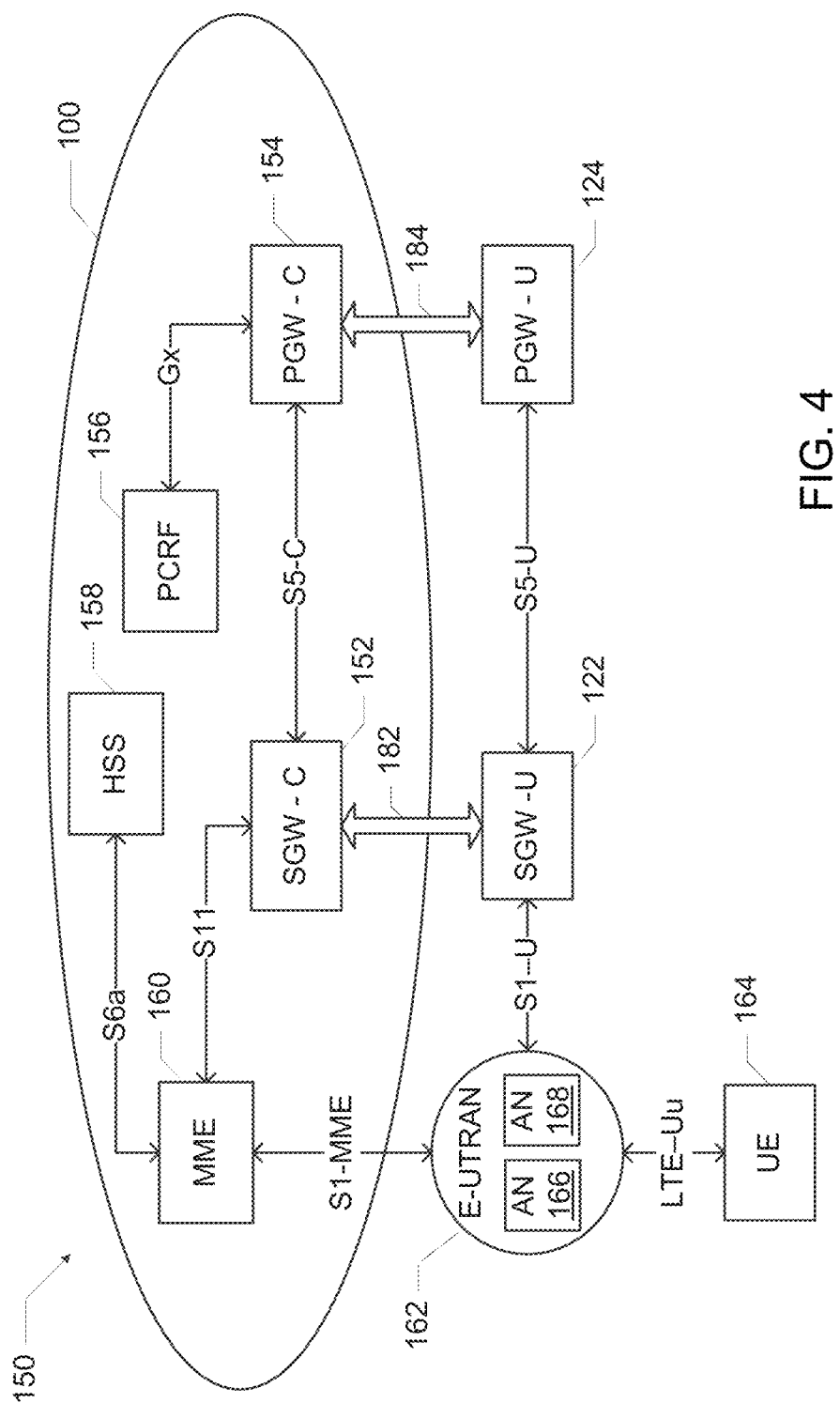
FIG. 4 illustrates a portion of an embodiment of a wireless communication network including an SGW-C, a PGW-C, an SGW-U and a PGW-U.

FIG. 4 illustrates a portion of an embodiment of the wireless communication network 150 including the SGW-C 152, the PGW-C 154, the SGW-U 122 and the PGW-U 124. The SGW-C 152 and the PGW-C 154 are included in the network controller 100, while the SGW-U 122 and the PGW-U 124 are different computing systems than the network controller 100. As discussed below in further detail, various embodiments of the wireless can indicate network 150 illustrated in FIG. 4 may implement control plane entities (e.g., a mobility management entity, the PGW control plane, the SGW control plane, a policy charging rules function, and a home subscriber server) as instances of a network function in the cloud, and control plane signaling exchanged between these entities may be implemented based on a cloud architecture. In some embodiments, components within the network controller 100 may communicate via wired and/or wireless communication pathways. For example, in some embodiments, components within the network controller 100 may communicate via wired communication pathways, such as Ethernet or optical fiber pathways.

The wireless communication network 150 may include one or more UEs. A single UE 164 is illustrated in FIG. 4, although the wireless communication network 150 may support many UEs. The UE 164 may include a wireless electronic device such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices.

The UE 164 may be configured to communicate via radio links with one or more access nodes (ANs). Two ANs 166 and 168 are illustrated in FIG. 4, although the wireless communication network 150 may support more or fewer ANs. Each AN may serve zero, one or more UEs in a cell associated with the AN. For example, the AN 166 may serve the UE 164. In some embodiments, the ANs 166 and 168 may include or be included in evolved node Bs (eNodeBs or eNBs), remote radio heads (RRHs), or other wireless communication components. In some embodiments, the AN 166 and the AN 168 may be eNodeBs deployed in a heterogeneous network. In such embodiments, the ANs 166 and 168 may be referred to as, for example, femto-, pico-, or macro-eNodeBs and may be respectively associated with femtocells, picocells, or macrocells. As shown in FIG. 4, in some embodiments, the ANs 166 and 168 may be included in an evolved universal mobile telecommunications system terrestrial radio access network (E-UTRAN) 162.

Wireless communication may include a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. For example, the UE 164 may be configured to communicate using a multiple-input and multiple-output (MIMO) communication scheme. The ANs 166 and 168 may include one or more antennas, one or more radio modules to modulate and/or demodulate signals transmitted or received on an air interface, and one or more digital modules to process signals transmitted and received on the air interface.

The E-UTRAN 162 may be communicatively coupled to a network controller 100, through which authentication, inter-AN communication, and a number of other functions may occur. The network controller 100 may include a number of components in addition to the SGW-C 152 and the PGW-C 154. In some embodiments, the communication link(s) between the E-UTRAN 162 and the network controller 100 may include wired communication links (such as electrically conductive cabling and/or optical cabling, for example) and/or wireless communication links. Examples of particular protocols and communication link types (e.g., reference points) used for communication between various components of the wireless communication network 150 are illustrated in FIG. 4 and described below, but any suitable communication links and protocols may be used.

The E-UTRAN 162 may be a computing system configured to perform, among other functions, header compression and user plane ciphering, mobility management entity (MME) selection, and congestion control. As shown in FIG. 4, in some embodiments, the E-UTRAN 162 may communicate with the MME 160 via an S1-MME interface. In some embodiments, the E-UTRAN 162 may communicate with the SGW-U 122 via an S1-U interface (e.g., for per bearer user plane tunneling and inter-AN path switching during handover). The S1-U interface may be based on the user data general packet radio service tunneling protocol (GTP-U). In GTP, each node (e.g., each end of the tunnel) may be identified by a tunnel endpoint identifier (TEID), an IP address, and a user datagram port (UDP) number.

The MME 160 may be a computing system configured to perform, among other functions, non-access stratum (NAS) signaling, PGW and SGW selection, MME selection for handovers with MME changes, authentication, authorization, and UE reachability procedures. In some embodiments, the SGW-C 152 and the MME 160 may be implemented in a common physical computing device. In some embodiments, the SGW-C 152 and the MME 160 may be implemented in different physical computing devices. The MME 160 and the SGW-C 152 may communicate via an S11 interface (e.g., when the SGW-C 152 and the MME 160 are not co-located). In some embodiments, communication between the SGW-U 122 and the MME 160 may take place via the SGW-C 152 (e.g., via the SGW control plane circuitry 102 of the SGW-C 152).

The home subscriber server (HSS) 158 may be a computing system configured to perform, among other functions, database functionality for user-related and subscriber-related information, mobility management assistance, call and session setup assistance, user authentication assistance, and access authorization assistance. As shown in FIG. 4, in some embodiments, the HSS 158 may communicate with the MME 160 via an S6a interface (e.g., to enable transfer of subscription and authentication data for authenticating/authorizing user access between the MME 160 and the HSS 158).

The policy charging and rules function (PCRF) 156 may be a computing system configured to perform, among other functions, enforcement of access policies and charging rules for use of the wireless communication network 150. As shown in FIG. 4, in some embodiments, the PCRF 156 may communicate with the PGW-C 154 via a Gx interface (e.g., to enable the transfer of quality of service (QoS) policy and charging rules from the PCRF 156 for performance of an enforcement function by the PGW-C 154).

The SGW-C 152 and the PGW-C 154 may communicate via an S5-C interface (e.g., to perform control plane tunneling and tunnel management between the SGW-C 152 and the PGW-C 154 when the SGW-C 152 and the PGW-C 154 are not co-located). The S5-C interface may be based on the general packet radio service tunneling protocol (GTP). In some embodiments, the communication circuitry 112 of the SGW-C 152 and the communication circuitry 114 of the PGW-C 154 may interact to establish a GTP tunnel between the SGW control plane circuitry 102 of the SGW-C 152 and the PGW control plane circuitry 104 of the PGW-C 154.

The SGW-U 122 and the PGW-U 124 may communicate via an S5-U interface (e.g., to perform control plane tunneling and tunnel management between the SGW-U 122 and the PGW-U 124 when the SGW-U 122 and the PGW-U 124 are not co-located). The S5-U interface may be based on GTP. In some embodiments, the communication circuitry 142 of the SGW-U 122 and the communication circuitry 144 of the PGW-U 124 may interact to establish a GTP tunnel between the SGW-U 122 and the PGW-U 124.

Although only a single SGW-U 122 and a single PGW-U 124 are illustrated in FIG. 4, this is simply for ease of illustration, and the wireless communication network 150 may include multiple SGW-Us and/or multiple PGW-Us, as discussed above with reference to FIG. 1. In some embodiments, additional SGW-Us may communicate with additional PGW-Us using the S5-U interface, as discussed above with reference to the SGW-U 122 and the PGW-U 124 of FIG. 4. In some embodiments, during handover of a UE (e.g., the UE 164) from the SGW-U 122, the network controller 100 (e.g., the SGW-C 152) may establish a secure communication link between the SGW-C 152 and a second SGW-U different from the SGW-U 122 in order to handover the UE to the second SGW-U.

FIG. 5 is a flow diagram of a process 500 for operating a network controller. For ease of illustration, the process 500 may be discussed below with reference to the network controller 100, the wireless communication network 150, the SGW-U 122 and the PGW-U 124. It may be recognized that, while the operations of the process 500 (and the other processes described herein) are arranged in a particular order and illustrated once each, in various embodiments, one or more of the operations may be repeated, omitted or performed out of order. For illustrative purposes, operations of the process 500 may be described as performed by the network controller 100, but the process 500 may be performed by any suitably configured device (e.g., a programmed processing system, an ASIC, or another wireless computing device).

At 502, the network controller 100 may virtualize control plane functions of an SGW or control plane functions of a PGW in the wireless communication network 150. Control plane functions of an SGW may be virtualized to provide the SGW-C 152. Control plane functions of a PGW may be virtualized to provide the PGW-C 154.

At 504, the network controller 100 may establish a first secure communication link between the network controller 100 and an SGW user plane computing system. The SGW user plane computing system may be configured to perform user plane functions of an SGW, and may be different from the network controller 100. In some embodiments, the SGW user plane computing system may be the SGW-U 122, and the first secure communication link may be the communication link 182.

At 506, the network controller 100 may establish a second secure communication link between the network controller 100 and a PGW user plane computing system. The PGW user plane computing system may be configured to perform user plane functions of a PGW, and may be different from the network controller 100. In some embodiments, the PGW user plane computing system may be the PGW-U 124, and the second secure communication link may be the communication link 184. The network controller 100 may communicate with the SGW user plane computing system via the first secure communication link and the PGW user plane computing system via the second secure communication link to perform various PGW- and SGW-related wireless communication operations. The process 500 may then end.

FIG. 6 is a flow diagram of a process 600 for operating a gateway user plane computing system, in accordance with various embodiments. For ease of illustration, the process 600 may be discussed below with reference to the network controller 100, the wireless communication network 150, the SGW-C 152 and the PGW-C 154. For illustrative purposes, operations of the process 600 may be described as performed by a "gateway user plane computing system," which may include the SGW-U 122 or the PGW-U 124, but the process 600 may be performed by any suitably configured device (e.g., a programmed processing system, an ASIC, or another wireless computing device).

At 602, the gateway user plane computing system may perform SGW user plane functions or PGW user plane functions. In some embodiments, the gateway user plane computing system may include the SGW-U 122 and may perform SGW user plane functions at 602. In some embodiments, the gateway user plane computing system may include the PGW-U 124 and may perform PGW user plane functions at 602. In some embodiments, the gateway user plane computing system may be configured to virtualize the SGW user plane functions or the PGW user plane functions in one or more computing devices. For example, in embodiments in which the gateway user plane computing system includes the SGW-U 122, the gateway user plane computing system may virtualize the SGW user plane functions. In embodiments in which the gateway user plane computing system includes the PGW-U 124, the gateway user plane computing system may virtualize the PGW user plane functions.

At 604, the gateway user plane computing system may establish a secure communication link with the network controller 100. The network controller 100 may be different from the gateway user plane computing system. The network controller 100 may include SGW control plane circuitry that performs control plane functions of an SGW or PGW control plane circuitry that performs control plane functions of a PGW. For example, the SGW control plane circuitry may be the SGW control plane circuitry 102. The PGW control plane circuitry may be the PGW control plane circuitry 104. The secure communication link of 604 may be configured for exchange of control messages between the gateway user plane computing system and the SGW control plane circuitry or the PGW control plane circuitry. In some embodiments, communication circuitry included in the gateway user plane computing system may establish the secure communication link at 604. For example, when the gateway user plane computing system includes the SGW-U 122, the communication circuitry 142 may establish the secure communication link at 604. When the gateway user plane computing system includes the PGW-U 124, the communication circuitry 144 may establish a secure communication link at 604. The network controller 100 and the gateway user plane computing system may communicate via the secure communication link to perform various PGW- and/or SGW-related wireless communication operations. The process 600 may then end.

Figure 7:
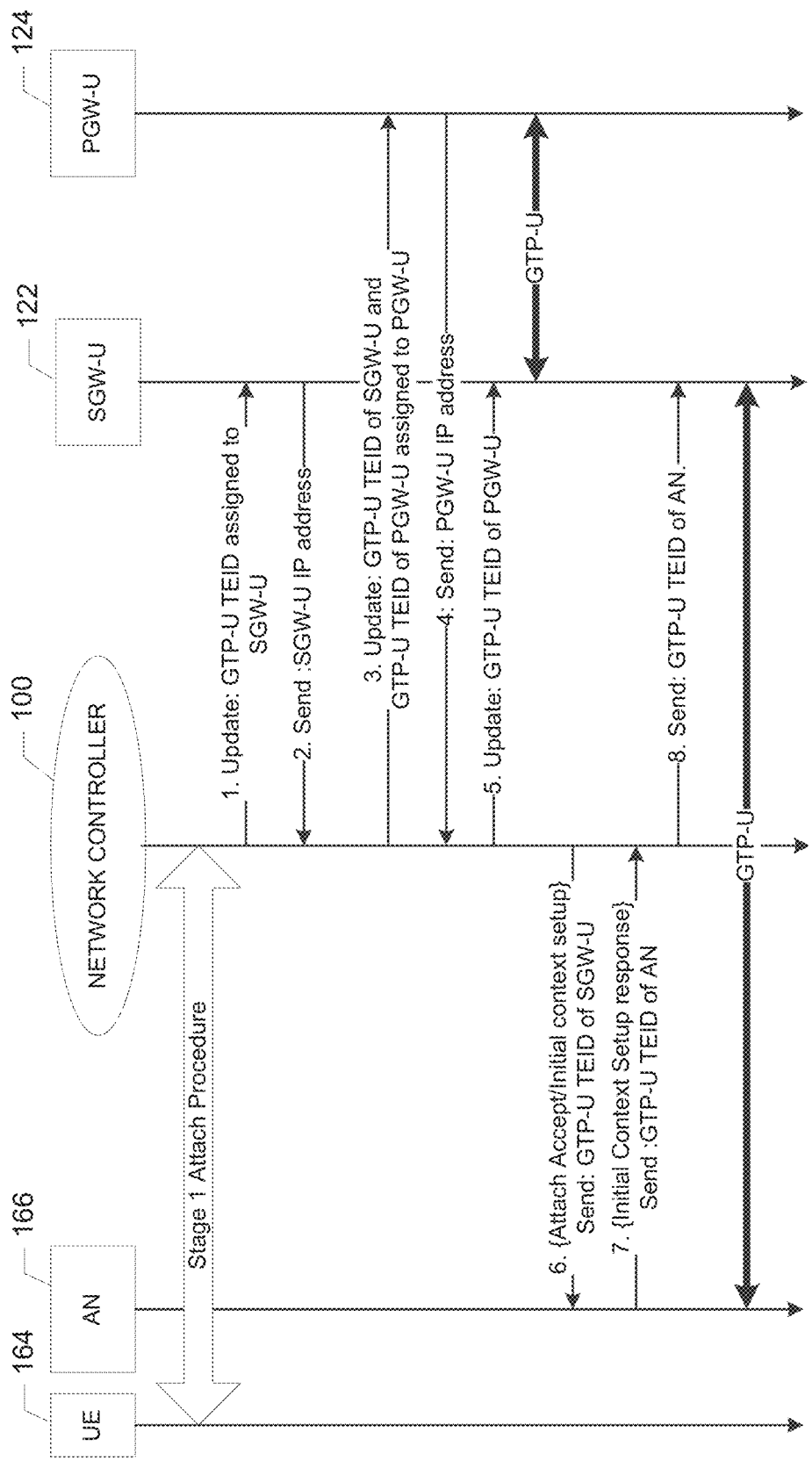
FIGS. 7-9 are signal diagrams of various embodiments of processes for user equipment (UE) attachment.
Figure 8:
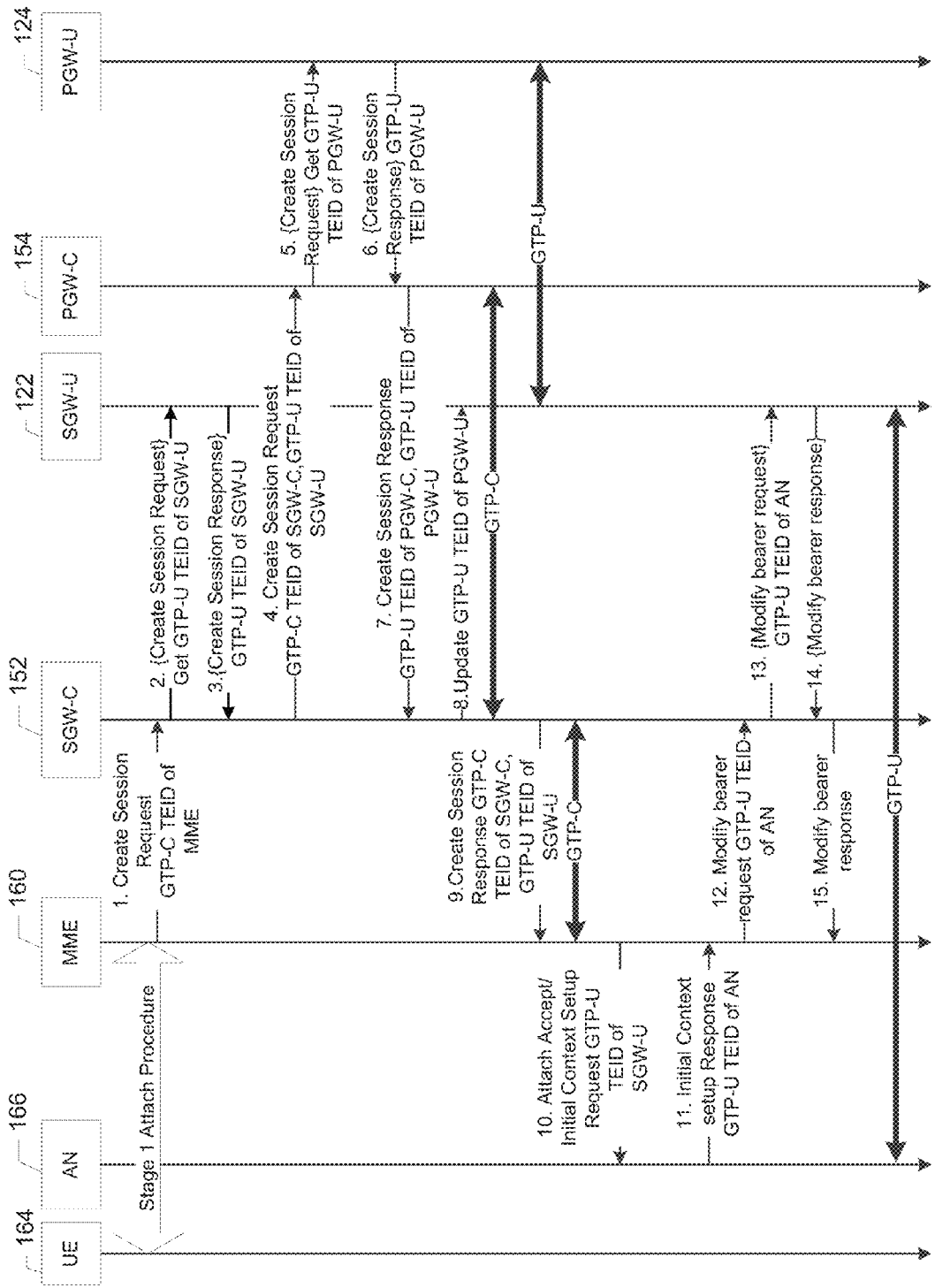
Figure 9:
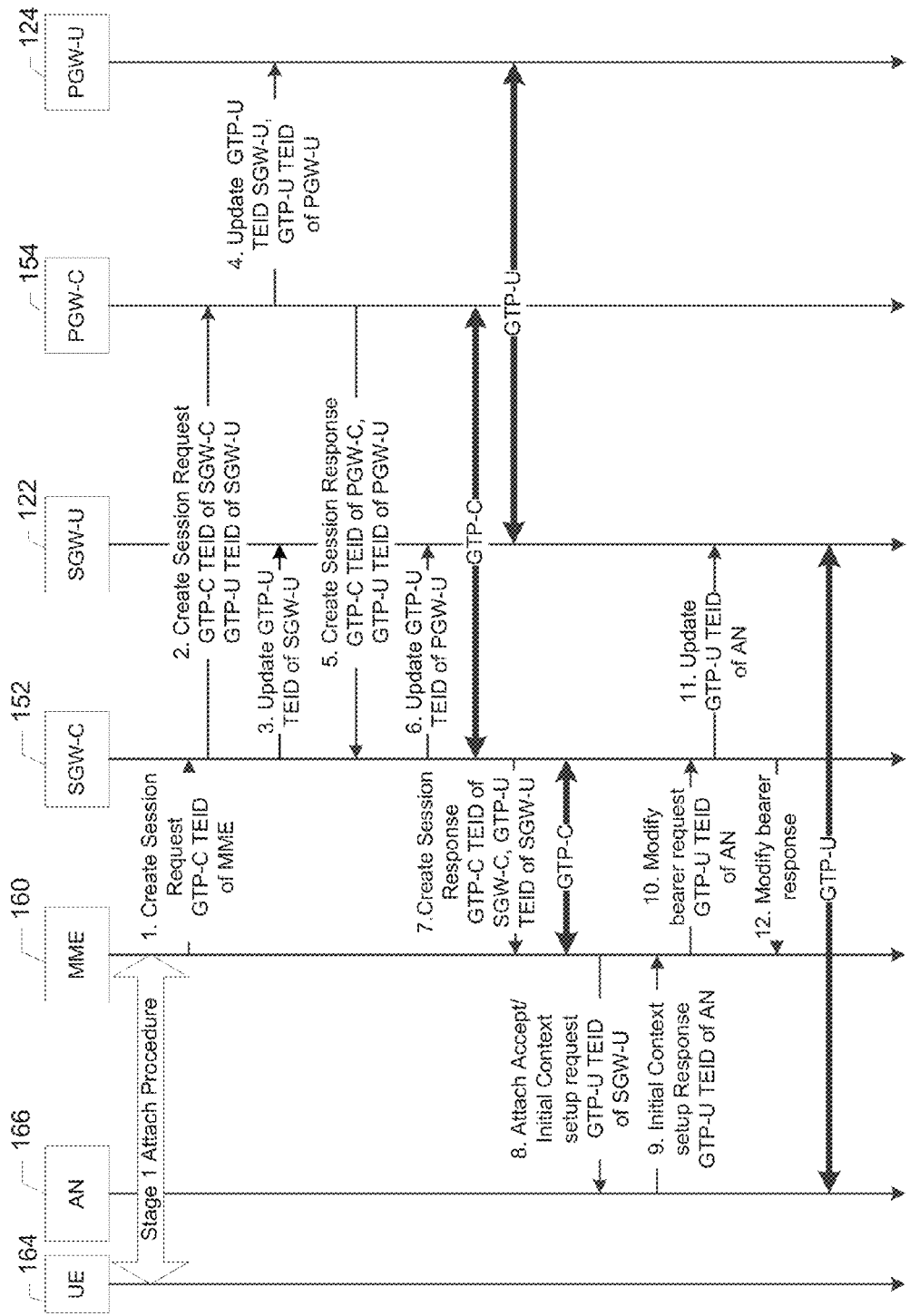

FIGS. 7-9 are signal diagrams of various embodiments of processes for UE attachment. As used herein, "attachment" may refer to the process of registering a UE with the wireless communication network 150 so that the UE may receive wireless communication services (that require registration) from the network 150. In particular, FIGS. 7-9 are signal diagrams of processes for UE attachment in embodiments of the wireless communication network 150 in which user plane and control plane functions of the SGW and/or the PGW are separated (e.g., into the SGW C 152/SGW-U 122 and/or the PGW-C 154/PGW-U 124), as discussed above.

Each of the signal diagrams of FIGS. 7-9 may begin with a Stage 1 Attach Procedure, discussed below. In FIG. 7, the Stage 1 Attach Procedure is illustrated as performed between the UE 164 and the network controller 100 of the wireless communication network 150 of FIG. 4. In FIGS. 8 and 9, the Stage 1 Attach Procedure is illustrated as performed between the UE 164 and the MME 160 of the network controller 100 of the wireless communication network 150 of FIG. 4. In some embodiments, the Stage 1 Attach Procedure may be performed in accordance with steps 1-11 of §5.3.2 of 3GPP Technical Specification 23.401. In some embodiments, the Stage 1 Attach Procedure may include the following signal flows:

a. The UE 164 may initiate the Attach procedure by the transmission, to the AN 166 serving the UE 164, of an Attach Request message together with radio resource control (RRC) parameters indicating the selected network and the old globally unique mobility management entity identifier (GUMMEI). The Attach Request message may take the form of a conventional LTE Attach Request Message, and the format of the Attach Request message is not discussed in further detail herein.

b. The AN 166 selects an MME (for ease of illustration, the MME 160) based on the RRC parameters carrying the old GUMMEI and the indicated selected network. The AN 166 forwards the Attach Request message, contained in a S1-MME control message, to the MME 160.

c. If the MME has changed since detach, the MME 160 sends an Identification Request to the old MME to request the international mobile subscriber identity (IMSI).

d. If the UE 164 is unknown to both the MME 160 and the old MME, the MME 160 sends an Identity Request to the UE 164 to request the IMSI. The UE 164 responds with Identity Response (IMSI).

e. If no UE context for the UE 164 exists anywhere in the network 150, if the Attach Request (sent in step 1) was not integrity protected, or if the check of the integrity failed, then authentication and NAS security setup to activate integrity protection and NAS ciphering are performed.

f. The MME 160 requests the international mobile equipment identifier software version (IMEISV) from the UE 164.

g. If the UE 164 has set the Ciphered Options Transfer Flag in the Attach Request message, the Ciphered Options are retrieved from the UE 164 by the MME 160.

h. If there are active bearer contexts in the MME 160 for the UE 164 (i.e., the UE re-attaches to the same MME without having properly detached before), the MME 160 deletes these bearer contexts by sending Delete Session Request messages to the gateways involved.

i. If the MME has changed since the last detach, or if there is no valid subscription context for the UE 164 in the MME 160, or if the UE 164 provides an IMSI that doesn't refer to a valid context in the MME 160, the MME 160 sends an Update Location Request message to the HSS 158. The Update Location Request message may take the form of a conventional LTE Update Location Request message, and the format of the Update Location Request message is not discussed in further detail herein.

j. The HSS 158 sends a Cancel Location message to the old MME.

k. If there are active bearer contexts in the old MME for the UE 164, the old MME deletes these bearer contexts by sending Delete Session Request messages to the gateways involved.

l. The HSS 158 acknowledges the Update Location message by sending an Update Location Ack message to the new MME 160.

Turning now to the signal flow of FIG. 7, after the Stage 1 Attach Procedure, the network controller 100 may transmit an update message to the SGW-U 122 to update the GTP-U tunnel endpoint identifier (TEID) assigned to the SGW-U 122. The network controller 100 may thus assign the TEID to the SGW-U 122. The SGW-U 122 may then send the IP address of the SGW-U 122 to the network controller 100. In some embodiments, the network controller 100 may include the MME 160, the SGW-C 152, and the PGW-C 154. The network controller 100 may be implemented as a cloud computing service. For ease of illustration, not all of the information included in a particular message is illustrated in the signal flow diagrams of FIGS. 7-10. For example, "send" messages may include additional information such as the network node address, a bearer identifier, a bearer quality of service, or any other conventional information.

The network controller 100 may then transmit an update message to the PGW-U 124 to provide the GTP-U TEID of the SGW-U 122 to the PGW-U 124, and to update the GTP-U TEID assigned to the PGW-U 124. The network controller 100 may thus assign the TEID to the PGW-U 124. The PGW-U 124 may then send the IP address of the PGW-U 124 to the network controller 100.

The network controller 100 may then transmit an update message to the SGW-U 122 to provide the GTP-U TEID of the PGW-U 124 to the SGW-U 122. The SGW-U 122 may use the GTP-U TEID of the PGW-U 124, and the PGW-U 124 may use the GTP-U TEID of the SGW-U 122, to establish a GTP-U tunnel between the SGW-U 122 and the PGW-U 124.

The network controller 100 may then accept the attachment and send the GTP-U TEID of the SGW-U 122 to the AN 166 (which may be, for example, an eNodeB). In response, the AN 166 may send the GTP-U TEID of the AN 166 to the network controller 100. The network controller 100 may then send the GTP-U TEID of the AN 166 to the SGW-U 122. The SGW-U 122 may use the GTP-U TEID of the AN 166, and the AN 166 may use the GTP-U TEID of the SGW-U 122, to establish a GTP-U tunnel between the SGW-U 122 and the AN 166.

Turning now to FIG. 8, a signal flow as illustrated in which the SGW-U 122 and the PGW-U 124 are responsible for GTP tunnel creation. After the Stage 1 Attach Procedure, the MME 160 may transmit a Create Session Request to the SGW-C 152, including the GTP-C TEID of the MME 160. The SGW-C 152 may then send a message to the SGW-U 122 to request the GTP-U TEID of the SGW-U 122. The SGW-U 122 may respond by sending the GTP-U TEID of the SGW-U 122 to the SGW-C 152. Thus, the SGW-U 122 may act as a forwarding node, and may create a local GTP-U TEID for itself.

The SGW-C 152 may then send a Create Session Request message, including the GTP-C TEID of the SGW-C 152 and the GTP-U TEID of the SGW-U 122, to the PGW-C 154. The PGW-C 154 may then send a message to the PGW-U 124 to request the GTP-U TEID of the PGW-U 124. The PGW-U 124 may respond by sending the GTP-U TEID of the PGW-U 124 to the PGW-C 154. Thus, the PGW-U 124 may act as a forwarding node, and may create a local GTP-U TEID for itself.

The PGW-C 154 may then provide the GTP-U TEID of the PGW-C 154 and the GTP-U TEID of the PGW-U 124 to the SGW-C 152. The SGW-C 152 may then provide the updated GTP-U TEID of the PGW-U 124 to the SGW-U 122. The SGW-C 152 may use the GTP-C TEID of the PGW-C 154, and the PGW-C 154 may use the GTP-C TEID of the SGW-C 152, to establish a GTP-C tunnel between the SGW-C 152 and the PGW-C 154. The SGW-U 122 may use the GTP-U TEID of the PGW-U 124, and the PGW-U 124 may use the GTP-U TEID of the SGW-U 122, to establish a GTP-U tunnel between the SGW-U 122 and the PGW-U 124.

The SGW-C 152 may then respond to the Create Session Request from the MME 160 with the GTP-C TEID of the SGW-C 152 and the GTP-U TEID of the SGW-U 122. The SGW-C 152 may use the GTP-C TEID of the MME 160, and the MME 160 may use the GTP-C TEID of the SGW-C 152, to establish a GTP-C tunnel between the SGW-C 152 and the MME 160.

The MME 160 may then accept the attachment and send the GTP-U TEID of the SGW-U 122 to the AN 166 (which may be, for example, an eNodeB). In response, the AN 166 may send the GTP-U TEID of the AN 166 to the MME 160. The MME 160 may then send a Modify Bearer Request message, including the GTP-U TEID of the AN 166, to the SGW-C 152. The SGW-C 152 may provide the GTP-U TEID of the AN 166 to the SGW-U 122. The SGW-U 122 and the SGW-C 152 may respond to the Modify Bearer Request. The SGW-U 122 may use the GTP-U TEID of the AN 166, and the AN 166 may use the GTP-U TEID of the SGW-U 122, to establish a GTP-U tunnel between the SGW-U 122 and the AN 166.

Although the signal flow of FIG. 8 illustrates a scenario in which there is a single SGW-C 152 and a single SGW-U 122, a single SGW-C 152 may control multiple SGW-Us (as discussed above with reference to FIG. 1). In some such scenarios, there exists the possibility that two or more different SGW-Us may create the same TEIDs for themselves and communicate those same TEIDs to the SGW-C 152. The SGW-C 152 may be configured to differentiate between the different SGW-Us based on the IP address of the SGW-Us (which may be assigned to the SGW-U hardware by the manufacturer, and may be static over the lifetime of the SGW-U).

Turning now to FIG. 9, a signal flow as illustrated in which the SGW-C 152 and the PGW-C 154 are responsible for GTP tunnel creation (in contrast to the signal flow of FIG. 8) and also for updating the SGW-U 122 and the PGW-U 152. After the Stage 1 Attach Procedure, the MME 160 may transmit a Create Session Request to the SGW-C 152, including the GTP-C TEID of the MME 160. The SGW-C 152 may then send a message to the PGW-C 154 with the GTP-C TEID of the SGW-C 152 and the GTP-U TEID of the SGW-U 122. The SGW-C 152 may also provide the GTP-U TEID of the SGW-U 122 to the SGW-U 122, thereby assigning the GTP-U TEID to the SGW-U 122. The PGW-C 154 may provide the GTP-U TEID of the SGW-U 122 and the GTP-U TEID of the PGW-U 124 to the PGW-U 124 (thereby assigning the GTP-U TEID to the PGW-U 124).

In response to the Create Session Request, the PGW-C 154 may provide the GTP-C TEID of the PGW-C 154 and the GTP-U TEID of the PGW-U 124 to the SGW-C 152. The SGW-C 152 may then provide the GTP-U TEID of the PGW-U 124 to the SGW-U 122. The SGW-C 152 may use the GTP-C TEID of the PGW-C 154, and the PGW-C 154 may use the GTP-C TEID of the SGW-C 152, to establish a GTP-C tunnel between the SGW-C 152 and the PGW-C 154. The SGW-U 122 may use the GTP-U TEID of the PGW-U 124, and the PGW-U 124 may use the GTP-U TEID of the SGW-U 122, to establish a GTP-U tunnel between the SGW-U 122 and the PGW-U 124.

The SGW-C 152 may then respond to the Create Session Request from the MME 160 with the GTP-C TEID of the SGW-C 152 and the GTP-U TEID of the SGW-U 122. The SGW-C 152 may use the GTP-C TEID of the MME 160, and the MME 160 may use the GTP-C TEID of the SGW-C 152, to establish a GTP-C tunnel between the SGW-C 152 and the MME 160.

The MME 160 may then accept the attachment and send the GTP-U TEID of the SGW-U 122 to the AN 166 (which may be, for example, an eNodeB). In response, the AN 166 may send the GTP-U TEID of the AN 166 to the MME 160. The MME 160 may then send a Modify Bearer Request message, including the GTP-U TEID of the AN 166, to the SGW-C 152. The SGW-C 152 may provide the GTP-U TEID of the AN 166 to the SGW-U 122, and may respond to the Modify Bearer Request. The SGW-U 122 may use the GTP-U TEID of the AN 166, and the AN 166 may use the GTP-U TEID of the SGW-U 122, to establish a GTP-U tunnel between the SGW-U 122 and the AN 166.

The signal flows of FIGS. 8 and 9 provide two different approaches to distribute them responsibility for GTP tunnel creation among various entities in a wireless communication network. The signal flow of FIG. 8 may be more suitable when more responsibility is desired to be allocated to the user plane (e.g., to the SGW-U 122 and the PGW-U 124), while the signal flow FIG. 9 may be more suitable when more responsibility is desired to be allocated to the control plane (e.g., to the SGW-C 152 and the PGW-C 154).

Figure 10:
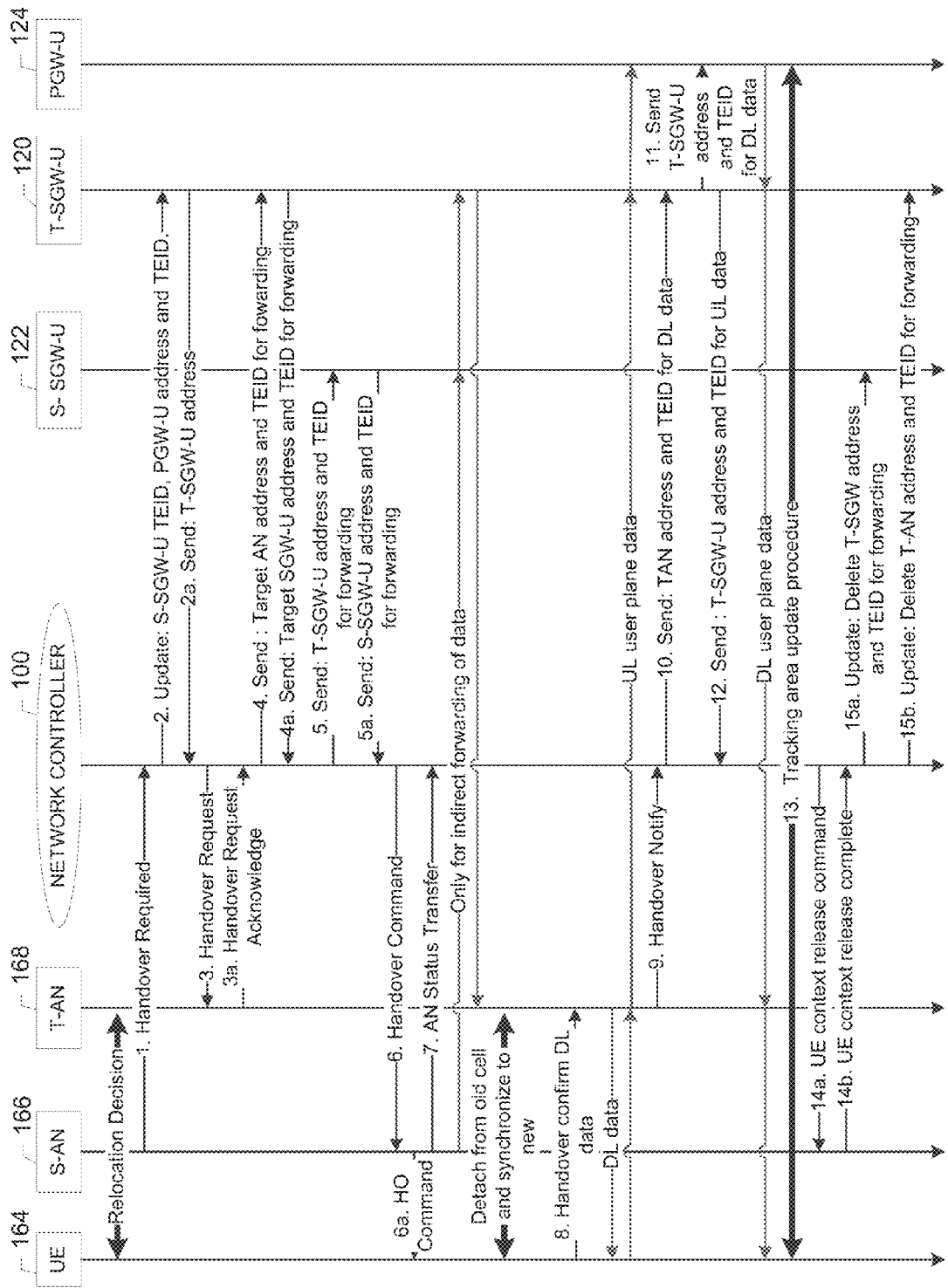
FIG. 10 is a signal diagram of a process for user equipment (UE) handover, in accordance with various embodiments.

FIG. 10 is a signal diagram of a process for UE handover, in accordance with various embodiments. As used herein, "handover" may refer to the process by which an AN may transfer service of a UE to another AN. For ease of illustration, the signal flow of FIG. 10 will be discussed with reference to the handover of the UE 164 from the AN 166 (referred to as the "source" AN or "S-AN")) to the AN 168 (referred to as the "target" AN, or "T-AN"). In particular, the handover process illustrated in FIG. 10 is an S1 interface-based handover, and involves a transfer between the SGW-U 122 (acting as a "source" SGW-U or "S-SGW-U") and the SGW-U 120 (acting as a "target" SGW-U or "T-SGW-U"). In some embodiments, the AN 166 and the AN 168 may be eNodeBs.

The signal diagram of FIG. 10 may begin when the decision is made to relocate the UE 164 from the S-AN 166 to the T-AN 168. This decision may be made by the S-AN 166. The S-AN 166 may send a Handover Required message to the network controller 100 (e.g., the MME 160). The Handover Required message may take the form of a conventional LTE Handover Required message, and the format of the Handover Required message is not discussed in further detail herein.

The network controller 100 may then send an update message to the T-SGW-U 120, providing the TEID of the S-SGW-U 122, and an address and a TEID of the PGW-U 124. In response, the T-SGW-U 120 may provide an address of the T-SGW-U 120 to the network controller 100.

The network controller 100 may then send a Handover Request message to the T-AN 168, which may respond with a Handover Request Acknowledge message. The Handover Request and Acknowledge messages may take the form of conventional LTE Handover Request and Acknowledge messages, and are not discussed in further detail herein.

The network controller 100 may send an address of the T-AN 168 to the T-SGW-U 120 for forwarding, along with the TEID of the T-AN 168. In response, the T-SGW-U 120 may send an address of the T-SGW-U 120 for forwarding, along with the TEID of the T-SGW-U 120.

The network controller 100 may send an address of the T-SGW-U 120 to the S-SGW-U 122 for forwarding, along with the TEID of the T-SGW-U 120. In response, the S-SGW-U 122 may send an address of the S-SGW-U 122 for forwarding, along with the TEID of the S-SGW-U 122.

The network controller 100 may then send a Handover Command to the S-AN 166, which may be followed by a Handover Command sent by the S-AN 166 to the UE 164. The Handover Commands may take the form of conventional LTE Handover Commands, and are not discussed in further detail herein. The S-AN 166 may respond by sending an AN Status Transfer message to the network controller 100. A communication pathway from the S-AN 166 to the S-SGW-U 122 and to the T-SGW-U 120, and the communication pathway from the T-SGW-U 120 to the T-AN 168 may be used for indirect forwarding of data. Indirect forwarding of data may be useful when, for example, a direct forwarding path enabled by X2 connectivity between the S-AN 166 and the T-AN 168 is not available.

The UE 164 may then detach from the old cell (covered by the S-AN 166) and may synchronize with the new cell (covered by the T-AN 168). The UE 164 may then send a Handover Confirm message to the T-AN 168, and may receive downlink data from the T-AN 168. The UE 164 may provide uplink user plane data to the T-AN 168 for transmission to the PGW-U 124.

The T-AN 168 may send a Handover Notify message to the network controller 100, which may respond by sending an address of the T-AN 168 to the T-SGW-U 120 for downlink data, along with the TEID of the T-AN 168. The T-SGW-U 120 may then send an address of the T-SGW-U 120 to the PGW-U 124 for downlink data, along with the TEID of the T-SGW-U 120. The T-SGW-U 120 may then send the address of the T-SGW-U 120 to the network controller 104 uplink data, along with the TEID of the T-SGW-U 120. The PGW-U 124 may provide downlink user plane data to the T-SGW-U 120 for transmission to the T-AN 168 and, subsequently, to the UE 164.

A tracking area update procedure may then be performed between the UE 164 and the PGW-U 124. The tracking area update procedure may take the form of a conventional LTE tracking area update procedure, and is not discussed in further detail herein. The network controller 100 may then transmit a UE context release command to the S-AN 166, which may respond with a UE content release complete message. The network controller 100 may then transmit an update message to the S-SGW-U 122, instructing the S-SGW-U 122 to delete the address of the T-SGW-U for forwarding, as well as the associated TEIDs. The network controller 100 may also transmit an update message to the T-SGW-U 120, instructing the T-SGW-U 120 to delete the address of the T-AN 168 for forwarding, as well as the associated TEIDs.

Figure 11:
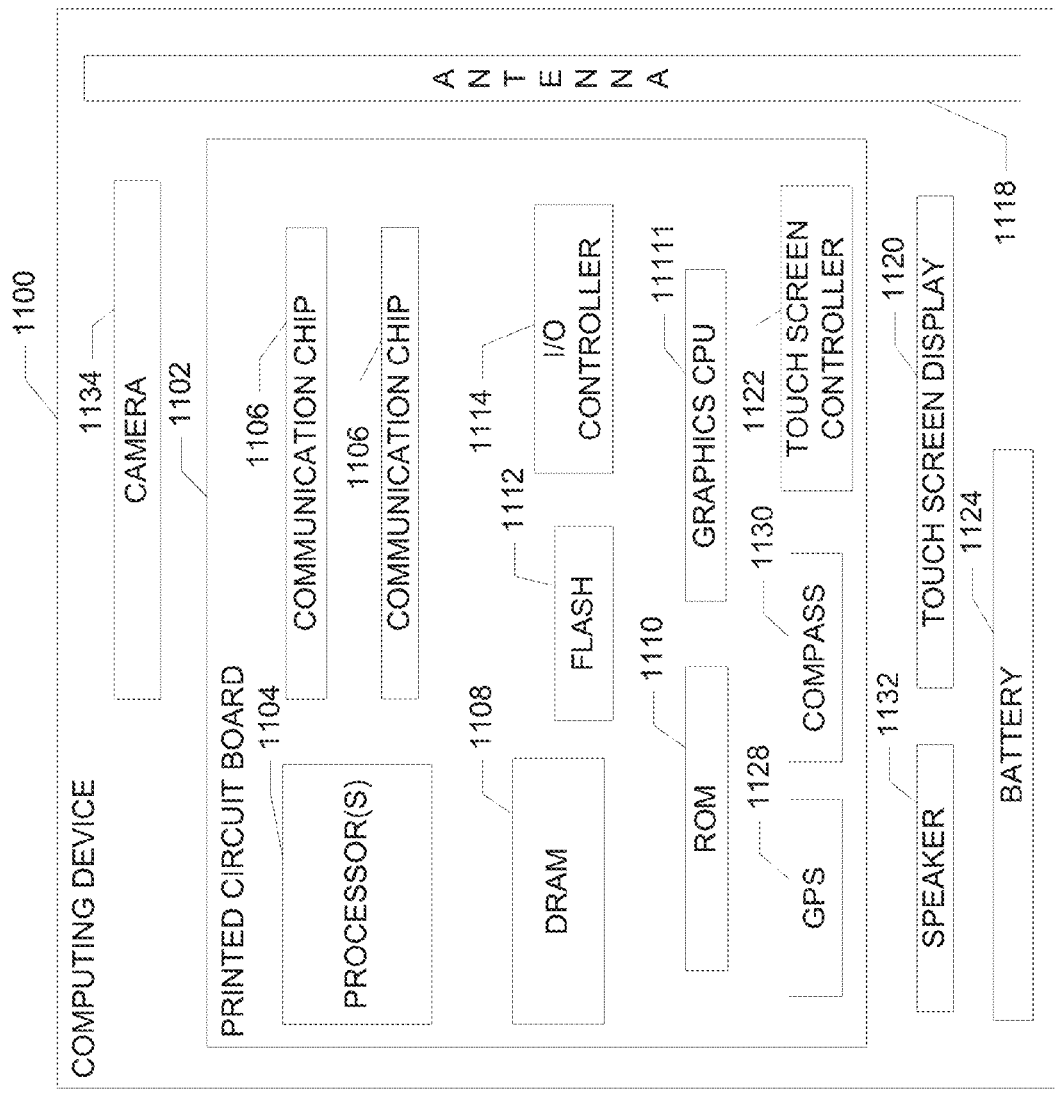
FIG. 11 is a block diagram of an example computing device that may be used to practice various embodiments described herein.

FIG. 11 is a block diagram of an example computing device 1100, which may be suitable for practicing various disclosed embodiments. For example, the computing device 1100 may serve as the SGW-C 152, the PGW-C 154, the SGW-U 122, the PGW-U 124, or any other suitable computing system discussed herein. Any of the circuitry disclosed herein may be implemented by suitable combinations of the hardware discussed below with reference to the computing device 1100 (e.g., programmed memory coupled with one or more processing devices). In some embodiments, the SGW-C 152, the PGW-C 154, the SGW-U 122, and/or the PGW-U 124 may include multiple ones of the computing device 1100, communicatively coupled to each other.

The computing device 1100 may include a number of components, including one or more processor(s) 1104 and at least one communication chip 1106. In various embodiments, the processor 1104 may include a processor core. In various embodiments, at least one communication chip 1106 may also be physically and electrically coupled to the processor 1104. In further implementations, the communication chip 1106 may be part of the processor 1104. In various embodiments, the computing device 1100 may include a printed circuit board (PCB) 1102. For these embodiments, the processor 1104 and the communication chip 1106 may be disposed thereon. In alternate embodiments, the various components may be coupled without the employment of the PCB 1102.

Depending on its applications (e.g., performing control or user plane functionalities), the computing device 1100 may include other components that may or may not be physically and electrically coupled to the PCB 1102. These other components include, but are not limited to, volatile memory (e.g., dynamic random access memory (DRAM) 1108), non-volatile memory (e.g., read-only memory (ROM) 1110, one or more hard disk drives, one or more solid-state drives, one or more compact disc drives, and/or one or more digital versatile disc drives), flash memory 1112, input/output controller 1114, a digital signal processor (not shown), a crypto processor (not shown), graphics processor 1116, one or more antenna 1118, touch screen display 1120, touch screen controller 1122, other displays (such as liquid-crystal displays, cathode-ray tube displays and e-ink displays, not shown), battery 1124, an audio codec (not shown), a video codec (not shown), global positioning system (GPS) device 1128, compass 1130, an accelerometer (not shown), a gyroscope (not shown), speaker 1132, camera 1134, and a mass storage device (such as hard disk drive, a solid state drive, compact disk (CD), digital versatile disk (DVD)) (not shown), any other desired sensors (not shown) and so forth. In various embodiments, the processor 1104 may be integrated on the same die with other components to form a System on Chip (SoC). Any components included in the computing device 1100 (e.g., sensors) may be used to perform various control plane or user plane functionalities, as suitable (e.g., in operations related to attachment or handover of a UE).

In various embodiments, volatile memory (e.g., DRAM 1108), non-volatile memory (e.g., ROM 1110), flash memory 1112, and the mass storage device may include a programming instructions configured to enable the computing device 1100, in response to execution by the processor(s) 1104, to practice all or selected aspects of the processes described herein (e.g., the control plane or user plane operations). For example, one or more of the memory components such as volatile memory (e.g., DRAM 1108), non-volatile memory (e.g., ROM 1110), flash memory 1112, and the mass storage device may be computer readable media that include temporal and/or persistent (e.g., non-transitory) copies of instructions thereon that, in response to execution by the one or more processor(s) 1104, cause the computing device 1100 to practice all or selected aspects of the processes described herein. Memory accessible to the computing device 1100 may include one or more storage resources that are physically part of a device on which the computing device 1100 is installed and/or one or more storage resources that is accessible by, but not necessarily a part of, the computing device 1100. For example, a storage resource may be accessed by the computing device 1100 over a network via the communications chip 1106. Any one or more of these memory devices may be included in the SGW-C 152, the PGW-C 154, the SGW-U 122, and/or the PGW-U 124.

The communication chip 1106 may enable wired and/or wireless communications for the transfer of data to and from the computing device 1100. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. Many of the embodiments described herein may be used with WiFi and 3GPP/LTE communication systems, as noted above. However, the communication chips 1106 may implement any of a number of wireless standards or protocols. The computing device 1100 may include a plurality of communication chips 1106. For instance, a first communication chip 1106 may be dedicated to shorter range wireless communications such as Wi-Fi and Bluetooth and a second communication chip 1106 may be dedicated to longer range wireless communications such as GPS, EDGE, GPRS, CDMA, WiMAX, LTE, Ev-DO, and others.

The computing device 1100 may be a laptop, a netbook, a notebook, an ultrabook, a smartphone, a computing tablet, a personal digital assistant, an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 1100 may be any other electronic device that processes data.

The following paragraphs describe examples of various embodiments. Example 1 is a network controller computing system, including: serving gateway (SGW) control plane circuitry to virtualize control plane functions of an SGW in a wireless communication network; packet data network gateway (PGW) control plane circuitry to virtualize control plane functions of a PGW in the wireless communication network; first communication circuitry to establish a first secure communication link between the SGW control plane circuitry and an SGW user plane computing system that is to perform user plane functions of an SGW, wherein the SGW user plane computing system is different from the network controller computing system; and second communication circuitry to establish a second secure communication link between the PGW control plane circuitry and a PGW user plane computing system that is to perform user plane functions of a PGW, wherein the PGW user plane computing system is different from the network controller computing system.

Example 2 may include the subject matter of Example 1, and may further specify that the network controller computing system is an evolved packet core controller.

Example 3 may include the subject matter of any of Examples 1-2, and may further specify that communication between a mobility management entity of the wireless communication network and the SGW user plane computing system is via the SGW control plane circuitry of the network controller computing system.

Example 4 may include the subject matter of any of Examples 1-3, and may further specify that the PGW user plane computing system is a first PGW user plane computing system, and may further include a third secure communication link between the PGW control plane circuitry and a second PGW user plane computing system that is to perform user plane functions of a PGW, wherein the second PGW user plane computing system is different from the network controller computing system and from the first PGW user plane computing system.

Example 5 may include the subject matter of any of Examples 1-4, and may further specify that the first communication circuitry is to establish a general packet radio service tunneling protocol (GTP) tunnel between the SGW control plane circuitry and the PGW control plane circuitry.

Example 6 may include the subject matter of any of Examples 1-5, and may further include a display device.

Example 7 is one or more non-transitory computer readable media having instructions thereon that, in response to execution by one or more processing devices of a network controller, cause the network controller to: virtualize control plane functions of a serving gateway (SGW) in a wireless communication network or control plane functions of a packet data network gateway (PGW) in the wireless communication network; establish a first secure communication link between the network controller and an SGW user plane computing system that is to perform user plane functions of a SGW, wherein the SGW user plane computing system is different from the network controller; and establish a second secure communication link between the network controller and a PGW user plane computing system that is to perform user plane functions of a PGW, wherein the PGW user plane computing system is different from the network controller.

Example 8 may include the subject matter of Example 7, and may further have instructions thereon that, in response to execution by the one or more processing devices of the network controller, cause the network controller to: generate a tunnel endpoint identifier (TEID) for the SGW user plane computing system; and provide the TEID for transmission to the SGW user plane computing system.

Example 9 may include the subject matter of any of Examples 7-8, and may further have instructions thereon that, in response to execution by the one or more processing devices of the network controller, cause the network controller to: receive a tunnel endpoint identifier (TEID) for the PGW user plane computing system generated by the PGW user plane computing system; and provide the TEID for the PGW user plane computing system for transmission to the SGW user plane computing system.

Example 10 may include the subject matter of any of Examples 7-9, and may further have instructions thereon that, in response to execution by the one or more processing devices of the network controller, cause the network controller to: provide a tunnel endpoint identifier for the SGW user plane computing system to an eNB as part of an attach procedure for a user equipment (UE) in communication with the eNB.

Example 11 may include the subject matter of any of Examples 7-10, and may further specify that the SGW user plane computing system is a first SGW user plane computing system, and further having instructions thereon that, in response to execution by the one or more processing devices of the network controller, cause the network controller to: during a handover of a UE, establish a third secure communication link between the network controller and a second SGW user plane computing system that is to perform user plane functions of an SGW, wherein the second SGW user plane computing system is different from the network controller and different from the first SGW user plane computing system.

Example 12 is a gateway user plane computing system, including: user plane circuitry to perform serving gateway (SGW) user plane functions or packet data network gateway (PGW) user plane functions in a wireless communication network; and communication circuitry to establish a secure communication link between the user plane circuitry and a network controller different from the gateway user plane computing system, wherein the network controller includes SGW control plane circuitry that is to perform control plane functions of an SGW or PGW control plane circuitry that is to perform control plane functions of a PGW, and wherein the secure communication link is for exchange of control messages with the SGW control plane circuitry or with the PGW control plane circuitry.

Example 13 may include the subject matter of Example 12, and may further specify that the network controller includes SGW control plane circuitry, and the SGW control plane circuitry virtualizes the SGW control plane functions.

Example 14 may include the subject matter of any of Examples 12-13, and may further specify that the network controller includes PGW control plane circuitry, and the PGW control plane circuitry virtualizes the PGW control plane functions.

Example 15 may include the subject matter of any of Examples 12-14, and may further specify that the secure communication link is for the receipt of data from a mobility management entity in the wireless communication network via the network controller.

Example 16 may include the subject matter of any of Examples 12-15, and may further specify that the communication circuitry includes a network interface card.

Example 17 may include the subject matter of any of Examples 12-16, and may further specify that the communication circuitry is to establish a general packet radio service tunneling protocol (GTP) tunnel between the gateway user plane computing system and a second gateway user plane computing system.

Example 18 may include the subject matter of Example 17, and may further specify that the user plane circuitry is to perform SGW user plane functions and the second gateway user plane computing system includes user plane circuitry to perform PGW user plane functions in the wireless communication network.

Example 19 may include the subject matter of any of Examples 17-18, and may further specify that the user plane circuitry is to perform PGW user plane functions and the second gateway user plane computing system includes user plane circuitry to perform SGW user plane functions in the wireless communication network.

Example 20 is one or more non-transitory computer readable media having instructions thereon that, in response to execution by one or more processing devices of a network controller, cause the network controller to: perform serving gateway (SGW) user plane functions or packet data network gateway (PGW) user plane functions in a wireless communication network; and establish a secure communication link with a network controller different from the gateway user plane computing system, wherein the network controller includes SGW control plane circuitry that is to perform control plane functions of an SGW or PGW control plane circuitry that is to perform control plane functions of a PGW, and wherein the secure communication link is for exchange of control messages with the SGW control plane circuitry or with the PGW control plane circuitry.

Example 21 may include the subject matter of Example 20, and may further have instructions thereon that, in response to execution by the one or more processing devices of the gateway user plane computing system, cause the gateway user plane computing system to receive, via the secure communication link, a tunnel endpoint identifier (TEID) for the a second gateway user plane computing system different from the gateway user plane computing system.

Example 22 may include the subject matter of Example 21, and may further have instructions thereon that, in response to execution by the one or more processing devices of the gateway user plane computing system, cause the gateway user plane computing system to establish, using the TEID, a general packet radio service tunneling protocol (GTP) tunnel between the gateway user plane computing system and the second gateway user plane computing system.

Example 23 may include the subject matter of any of Examples 20-22, and may further have instructions thereon that, in response to execution by the one or more processing devices of the gateway user plane computing system, cause the gateway user plane computing system to virtualize the SGW user plane functions or PGW user plane functions in one or more computing systems.

Example 24 may include the subject matter of any of Examples 20-23, and may further have instructions thereon that, in response to execution by the one or more processing devices of the gateway user plane computing system, cause the gateway user plane computing system to perform SGW user plane functions.

Example 25 may include the subject matter of any of Examples 20-24, and may further have instructions thereon that, in response to execution by the one or more processing devices of the gateway user plane computing system, cause the gateway user plane computing system to perform PGW user plane functions.

Example 26 is a method for execution by a network controller computing system, including: virtualizing control plane functions of a serving gateway (SGW) in a wireless communication network; virtualizing control plane functions of a packet data network gateway (PDW) in the wireless communication network; establishing a first secure communication link between the network controller computing system and an SGW user plane computing system that is to perform user plane functions of an SGW, wherein the SGW user plane computing system is different from the network controller computing system; and establishing a second secure communication link between the network controller computing system and a PGW user plane computing system that is to perform user plane functions of a PGW, wherein the PGW user plane computing system is different from the network controller computing system.

Example 27 may include the subject matter of Example 26, and may further specify that the network controller computing system is an evolved packet core controller.

Example 28 may include the subject matter of any of Examples 26-27, and may further include enabling communication between a mobility management entity of the wireless communication network and the SGW user plane computing system via the network controller computing system.

Example 29 may include the subject matter of any of Examples 26-28, and may further specify that the PGW user plane computing system is a first PGW user plane computing system, and wherein the method further includes establishing a third secure communication link between the network controller computing system and a second PGW user plane computing system that is to perform user plane functions of a PGW, wherein the second PGW user plane computing system is different from the network controller computing system and from the first PGW user plane computing system.

Example 30 may include the subject matter of any of Examples 26-29, and may further include establishing a general packet radio service tunneling protocol (GTP) tunnel between the SGW control plane circuitry and the PGW control plane circuitry.

Example 31 may include the subject matter of any of Examples 26-30, and may further specify that establishing a first secure communication link includes establishing a first secure wireless communication link.

Example 32 is a method for execution by a network controller, including: virtualizing control plane functions of a serving gateway (SGW) in a wireless communication network or control plane functions of a packet data network gateway (PGW) in the wireless communication network; establishing a first secure communication link between the network controller and an SGW user plane computing system that is to perform user plane functions of a SGW, wherein the SGW user plane computing system is different from the network controller; and establishing a second secure communication link between the network controller and a PGW user plane computing system that is to perform user plane functions of a PGW, wherein the PGW user plane computing system is different from the network controller.

Example 33 may include the subject matter of Example 32, and may further include: generating a tunnel endpoint identifier (TEID) for the SGW user plane computing system; and providing the TEID for transmission to the SGW user plane computing system.

Example 34 may include the subject matter of any of Examples 32-33, and may further include: receiving a tunnel endpoint identifier (TEID) for the PGW user plane computing system generated by the PGW user plane computing system; and providing the TEID for the PGW user plane computing system for transmission to the SGW user plane computing system.

Example 35 may include the subject matter of any of Examples 32-34, and may further include providing a tunnel endpoint identifier for the SGW user plane computing system to an eNB as part of an attach procedure for a user equipment (UE) in communication with the eNB.

Example 36 may include the subject matter of any of Examples 32-35, and may further specify that the SGW user plane computing system is a first SGW user plane computing system, and may further include, during a handover of a UE, establishing a third secure communication link between the network controller and a second SGW user plane computing system that is to perform user plane functions of an SGW, wherein the second SGW user plane computing system is different from the network controller and different from the first SGW user plane computing system.

Example 37 is a method for execution by a gateway user plane computing system, including: performing serving gateway (SGW) user plane functions or packet data network gateway (PGW) user plane functions in a wireless communication network; and establishing a secure communication link between the gateway user plane computing system and a network controller different from the gateway user plane computing system, wherein the network controller includes SGW control plane circuitry that is to perform control plane functions of an SGW or PGW control plane circuitry that is to perform control plane functions of a PGW, and wherein the secure communication link is for exchange of control messages with the SGW control plane circuitry or with the PGW control plane circuitry.

Example 38 may include the subject matter of Example 37, and may further specify that the network controller includes SGW control plane circuitry, and the SGW control plane circuitry virtualizes the SGW control plane functions.

Example 39 may include the subject matter of any of Examples 37-38, and may further specify that the network controller includes PGW control plane circuitry, and the PGW control plane circuitry virtualizes the PGW control plane functions.

Example 40 may include the subject matter of any of Examples 37-39, and may further specify that the secure communication link is for the receipt of data from a mobility management entity in the wireless communication network via the network controller.

Example 41 may include the subject matter of any of Examples 37-40, and may further specify that establishing a secure communication link comprises establishing a secure communication link via a network interface card.

Example 42 may include the subject matter of any of Examples 37-41, and may further include establishing a general packet radio service tunneling protocol (GTP) tunnel between the gateway user plane computing system and a second gateway user plane computing system.

Example 43 may include the subject matter of Example 42, and may further include performing SGW user plane functions, wherein the second gateway user plane computing system includes user plane circuitry to perform PGW user plane functions in the wireless communication network.

Example 44 may include the subject matter of any of Examples 42-43, and may further include performing PGW user plane functions, wherein the second gateway user plane computing system includes user plane circuitry to perform SGW user plane functions in the wireless communication network.

Example 45 may include the subject matter of any of Examples 37-44, and may further include receiving, via the secure communication link, a tunnel endpoint identifier (TEID) for the a second gateway user plane computing system different from the gateway user plane computing system.

Example 46 may include the subject matter of Example 45, and may further include establishing, using the TEID, a general packet radio service tunneling protocol (GTP) tunnel between the gateway user plane computing system and the second gateway user plane computing system.

Example 47 may include the subject matter of any of Examples 37-46, and may further include virtualizing the SGW user plane functions or PGW user plane functions in one or more computing systems.

Example 48 may include the subject matter of any of Examples 37-47, and may further include performing SGW user plane functions.

Example 49 may include the subject matter of any of Examples 37-48, and may further include performing PGW user plane functions.

Example 50 is one or more non-transitory computer readable media having instructions thereon that, in response to execution by one or more processing devices of a computing system, cause the computing system to perform the method of any of Examples 26-49.

Example 51 is an apparatus comprising means for performing the method of any of Examples 26-49.

Example 52 is an apparatus for network control, including: means for virtualizing control plane functions of a serving gateway (SGW) in a wireless communication network; means for virtualizing control plane functions of a packet data network gateway (PDW) in the wireless communication network; means for establishing a first secure communication link between the apparatus and an SGW user plane computing system that is to perform user plane functions of an SGW, wherein the SGW user plane computing system is different from the apparatus; and means for establishing a second secure communication link between the apparatus and a PGW user plane computing system that is to perform user plane functions of a PGW, wherein the PGW user plane computing system is different from the apparatus.

Example 53 may include the subject matter of Example 52, and may further specify that the apparatus is an evolved packet core controller.

Example 54 may include the subject matter of any of Examples 52-53, and may further include means for enabling communication between a mobility management entity of the wireless communication network and the SGW user plane computing system via the apparatus.

Example 55 may include the subject matter of any of Examples 52-54, and may further specify that the PGW user plane computing system is a first PGW user plane computing system, and wherein the apparatus further includes means for establishing a third secure communication link between the apparatus and a second PGW user plane computing system that is to perform user plane functions of a PGW, wherein the second PGW user plane computing system is different from the apparatus and from the first PGW user plane computing system.

Example 56 may include the subject matter of any of Examples 52-55, and may further include means for establishing a general packet radio service tunneling protocol (GTP) tunnel between the SGW control plane circuitry and the PGW control plane circuitry.

Example 57 may include the subject matter of any of Examples 52-56, and may further specify that the means for establishing a first secure communication link comprises means for establishing a first secure wireless communication link.

Example 58 is an apparatus for network control, including: means for virtualizing control plane functions of a serving gateway (SGW) in a wireless communication network or control plane functions of a packet data network gateway (PGW) in the wireless communication network; means for establishing a first secure communication link between the apparatus and an SGW user plane computing system that is to perform user plane functions of a SGW, wherein the SGW user plane computing system is different from the apparatus; and means for establishing a second secure communication link between the apparatus and a PGW user plane computing system that is to perform user plane functions of a PGW, wherein the PGW user plane computing system is different from the apparatus.

Example 59 may include the subject matter of Example 58, and may further include means for generating a tunnel endpoint identifier (TEID) for the SGW user plane computing system; and means for providing the TEID for transmission to the SGW user plane computing system.

Example 60 may include the subject matter of any of Examples 58-59, and may further include: means for receiving a tunnel endpoint identifier (TEID) for the PGW user plane computing system generated by the PGW user plane computing system; and means for providing the TEID for the PGW user plane computing system for transmission to the SGW user plane computing system.

Example 61 may include the subject matter of any of Examples 58-60, and may further include means for providing a tunnel endpoint identifier for the SGW user plane computing system to an eNB as part of an attach procedure for a user equipment (UE) in communication with the eNB.

Example 62 may include the subject matter of any of Examples 58-61, and may further specify that the SGW user plane computing system is a first SGW user plane computing system, and may further include means for, during a handover of a UE, establishing a third secure communication link between the apparatus and a second SGW user plane computing system that is to perform user plane functions of an SGW, wherein the second SGW user plane computing system is different from the apparatus and different from the first SGW user plane computing system.

Example 63 is a gateway user plane computing apparatus, including: means for performing serving gateway (SGW) user plane functions or packet data network gateway (PGW) user plane functions in a wireless communication network; and means for establishing a secure communication link between the apparatus and a network controller different from the apparatus, wherein the network controller includes SGW control plane circuitry that is to perform control plane functions of an SGW or PGW control plane circuitry that is to perform control plane functions of a PGW, and wherein the secure communication link is for exchange of control messages with the SGW control plane circuitry or with the PGW control plane circuitry.

Example 64 may include the subject matter of Example 63, and may further specify that the network controller includes SGW control plane circuitry, and the SGW control plane circuitry virtualizes the SGW control plane functions.

Example 65 may include the subject matter of any of Examples 63-64, and may further specify that the network controller includes PGW control plane circuitry, and the PGW control plane circuitry virtualizes the PGW control plane functions.

Example 66 may include the subject matter of any of Examples 63-65, and may further specify that the secure communication link is for the receipt of data from a mobility management entity in the wireless communication network via the network controller.

Example 67 may include the subject matter of any of Examples 63-66, and may further specify that the means for establishing a secure communication link comprises means for establishing a secure communication link via a network interface card.

Example 68 may include the subject matter of any of Examples 63-67, and may further include means for establishing a general packet radio service tunneling protocol (GTP) tunnel between the apparatus and a second gateway user plane computing apparatus.

Example 69 may include the subject matter of Example 68, and may further include means for performing SGW user plane functions, wherein the second gateway user plane computing apparatus includes user plane circuitry to perform PGW user plane functions in the wireless communication network.

Example 70 may include the subject matter of any of Examples 68-69, and may further include means for performing PGW user plane functions, wherein the second gateway user plane computing apparatus includes user plane circuitry to perform SGW user plane functions in the wireless communication network.

Example 71 may include the subject matter of any of Examples 63-70, and may further include means for receiving, via the secure communication link, a tunnel endpoint identifier (TEID) for the a second gateway user plane computing apparatus different from the gateway user plane computing apparatus.

Example 72 may include the subject matter of Example 71, and may further include means for establishing, using the TEID, a general packet radio service tunneling protocol (GTP) tunnel between the apparatus and the second gateway user plane computing apparatus.

Example 73 may include the subject matter of any of Examples 63-72, and may further include means for virtualizing the SGW user plane functions or PGW user plane functions in one or more computing systems.

Example 74 may include the subject matter of Example 63, and may further include means for performing SGW user plane functions.

Example 75 may include the subject matter of Example 63, and may further include means for performing PGW user plane functions.

What is claimed is:

1. A network controller computing system, comprising:
serving gateway (SGW) control plane circuitry to virtualize control plane functions of an SGW in a wireless communication network;
packet data network gateway (PGW) control plane circuitry to virtualize control plane functions of a PGW in the wireless communication network;
first communication circuitry to establish a first secure communication link between the SGW control plane circuitry and an SGW user plane computing system that is to perform user plane functions of an SGW, wherein the SGW user plane computing system is different from the network controller computing system; and
second communication circuitry to establish a second secure communication link between the PGW control plane circuitry and a PGW user plane computing system that is to perform user plane functions of a PGW, wherein the PGW user plane computing system is different from the network controller computing system,
wherein:
the first communication circuitry is to further transmit, following a first stage of an attach procedure, an update message to the SGW user plane computing system to update a user data general packet radio service tunneling protocol (GTP-U) tunnel endpoint identifier assigned to the SGW user plane computing system; and
the network controller computing system is to further transmit in an attach accept message or an initial context setup message, the GTP-U tunnel endpoint identifier assigned to the SGW user plane computing system to an access node.

2. The network controller computing system of claim 1, wherein the network controller computing system is an evolved packet core controller.

3. The network controller computing system of claim 1, wherein communication between a mobility management entity of the wireless communication network and the SGW user plane computing system is via the SGW control plane circuitry of the network controller computing system.

4. The network controller computing system of claim 1, wherein the PGW user plane computing system is a first PGW user plane computing system, and further comprising a third secure communication link between the PGW control plane circuitry and a second PGW user plane computing system that is to perform user plane functions of a PGW, wherein the second PGW user plane computing system is different from the network controller computing system and from the first PGW user plane computing system.

5. The network controller computing system of claim 1, wherein the first communication circuitry is to establish a GTP tunnel between the SGW control plane circuitry and the PGW control plane circuitry.

6. The network controller computing system of claim 1, further comprising a display device.

7. One or more non-transitory computer readable media having instructions thereon that, in response to execution by one or more processing devices of a network controller, cause the network controller to:
virtualize control plane functions of a serving gateway (SGW) in a wireless communication network or control plane functions of a packet data network gateway (PGW) in the wireless communication network;
establish a first secure communication link between the network controller and an SGW user plane computing system that is to perform user plane functions of a SGW, wherein the SGW user plane computing system is different from the network controller;

establish a second secure communication link between the network controller and a PGW user plane computing system that is to perform user plane functions of a PGW, wherein the PGW user plane computing system is different from the network controller;

transmit, following a first stage of an attach procedure, an update message to the SGW user plane computing system to update a user data general packet radio service tunneling protocol (GTP-U) tunnel endpoint identifier assigned to the SGW user plane computing system; and transmit, in an attach accept message or an initial context setup message, the GTP-U tunnel endpoint identifier assigned to the SGW user plane computing system to an access node.

8. The one or more non-transitory computer readable media of claim 7, further having instructions thereon that, in response to execution by the one or more processing devices of the network controller, cause the network controller to:

receive a tunnel endpoint identifier (TEID) for the PGW user plane computing system generated by the PGW user plane computing system; and provide the TEID for the PGW user plane computing system for transmission to the SGW user plane computing system.

9. The one or more non-transitory computer readable media of claim 7, wherein the SGW user plane computing system is a first SGW user plane computing system, and further having instructions thereon that, in response to execution by the one or more processing devices of the network controller, cause the network controller to:

during a handover of a UE, establish a third secure communication link between the network controller and a second SGW user plane computing system that is to perform user plane functions of an SGW, wherein the second SGW user plane computing system is different from the network controller and different from the first SGW user plane computing system.

* * * * *